APPARATUS FOR PERFORMING CHARACTER OPERATIONS

Filed Oct. 1, 1965 11 Sheets-Sheet 1

INVENTORS
Chester G. Bell
Alan Kotok
BY
Blair Buckles and Cesari
ATTORNEYS

APPARATUS FOR PERFORMING CHARACTER OPERATIONS

Filed Oct. 1, 1965 11 Sheets-Sheet 2

INVENTORS
Chester G. Bell
Alan Kotok
BY
Blair Buckles and Cesari
ATTORNEYS

APPARATUS FOR PERFORMING CHARACTER OPERATIONS
Filed Oct. 1, 1965 11 Sheets-Sheet 3
FIG. 3
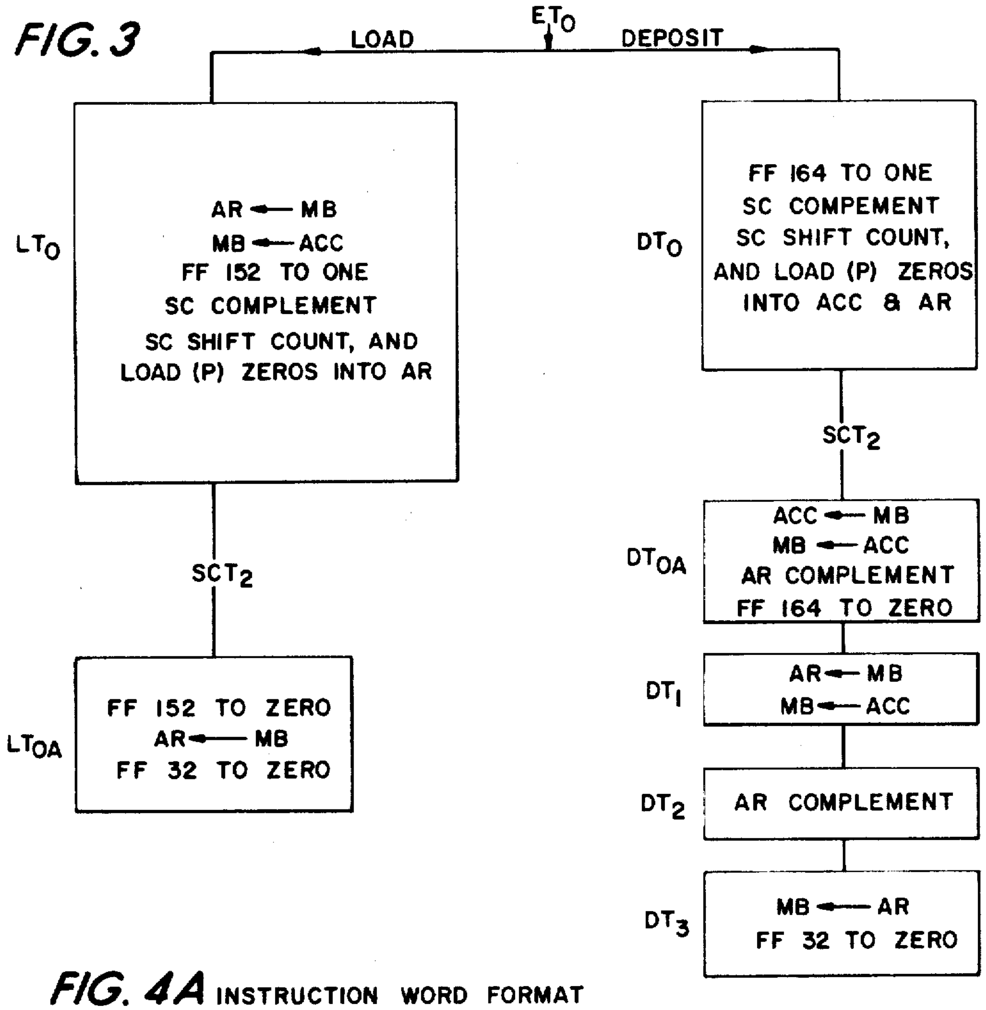
FIG. 4A INSTRUCTION WORD FORMAT
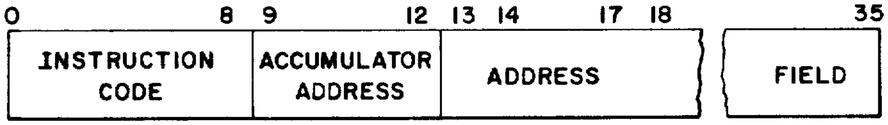
FIG. 4B BYTE POINTER WORD FORMAT
INVENTORS
Chester G. Bell
Alan Kotok
BY
Blair Buckles and Cesari
ATTORNEYS INVENTORS
Chester G. Bell
Alan Kotok
BY
Blair Buckles and Cesari
ATTORNEYS INVENTORS
Chester G. Bell
BY Alan Kotok
Blair Buckles and Cesari
ATTORNEYS INVENTORS
Chester G. Bell
Alan Kotok
BY
Blair Buckles and Cesari
ATTORNEYS INVENTORS
Chester G. Bell
Alan Kotok
BY
Blair Buckles and Cesari
ATTORNEYS

APPARATUS FOR PERFORMING CHARACTER OPERATIONS

INVENTORS
Chester G. Bell
Alan Kotok
BY
Blair Buckles and Cesari
ATTORNEYS

APPARATUS FOR PERFORMING CHARACTER OPERATIONS

Filed Oct. 1, 1965 11 Sheets-Sheet 9

INVENTORS
Chester G. Bell
Alan Kotok
BY Blair Buckles and Cesari
ATTORNEYS

APPARATUS FOR PERFORMING CHARACTER OPERATIONS

INVENTORS
Chester G. Bell
Alan Kotok
BY
Blair Buckles and Cesari
ATTORNEYS

INVENTORS
Chester G. Bell
BY Alan Kotok
Blair Buckles and Cesari
ATTORNEYS

United States Patent Office 3,401,375
Patented Sept. 10, 1968

3,401,375
APPARATUS FOR PERFORMING CHARACTER OPERATIONS

Chester G. Bell, Concord, and Alan Kotok, Belmont, Mass., assignors to Digital Equipment Corporation, Maynard, Mass.

Filed Oct. 1, 1965, Ser. No. 491,954
26 Claims. (Cl. 340—172.5)

ABSTRACT OF THE DISCLOSURE

Apparatus for performing digital data processing operations on a byte of one or more contiguous digits within a word that contains other information in addition to the byte is described. Each word may contain several bytes and the invention provides apparatus whereby any byte can be operated on without disturbing other bytes in the same word, special control words known as "byte pointers" control the extraction of bytes from, or the storage of bytes in, successive positions within the data words or successive words in memory. Apparatus is also provided to index the information in the control words automatically to insure storage and retrieval of bytes in the proper sequence.

INTRODUCTION

A digital computing system organized to handle words of thirty-six digits, for example, may be called upon to operate under a program in which each item of information is contained in a lesser number of digits, for example, in seven consecutive digits. It is then desirable to store five of these seven-digit bytes, involving a total of thirty-five digits, in each thirty-six-digit memory location; each memory location then has one unused digit position or stage.

It is an object of the present invention to provide improved digital data processing apparatus for operating on a byte of consecutive digits.

Another object of the invention is to provide such apparatus that is logically efficient.

A further object of the invention is to provide apparatus of the above type for handling bytes of random sizes.

It is also an object of the invention to provide apparatus of the above type for handling bytes recorded anywhere within a memory word.

Another object of the invention is to provide logically efficient apparatus for processing bytes having successive memory addresses.

A further object is to provide digital data processing apparatus for retrieving a byte of any number of digits from anywhere within a memory location having a capacity larger than the byte. A corollary object is to provide digital data processing apparatus for writing a byte of any number of digits anywhere within a memory location having a capacity larger than the byte.

Other objects of the invention will in part be obvious and will in part appear hereinafter.

The invention accordingly comprises the features of construction, combination of elements and arrangement of parts exemplified in the construction hereinafter set forth, and the scope of the invention will be indicated in the claims.

For a fuller understanding of the nature and objects of the invention, reference should be had to the following detailed description taken in connection with the accompanying drawings, in which:

FIGURES 2 and 3 are flow charts illustrating the performance of byte manipulations in accordance with the invention;

Figure 1:
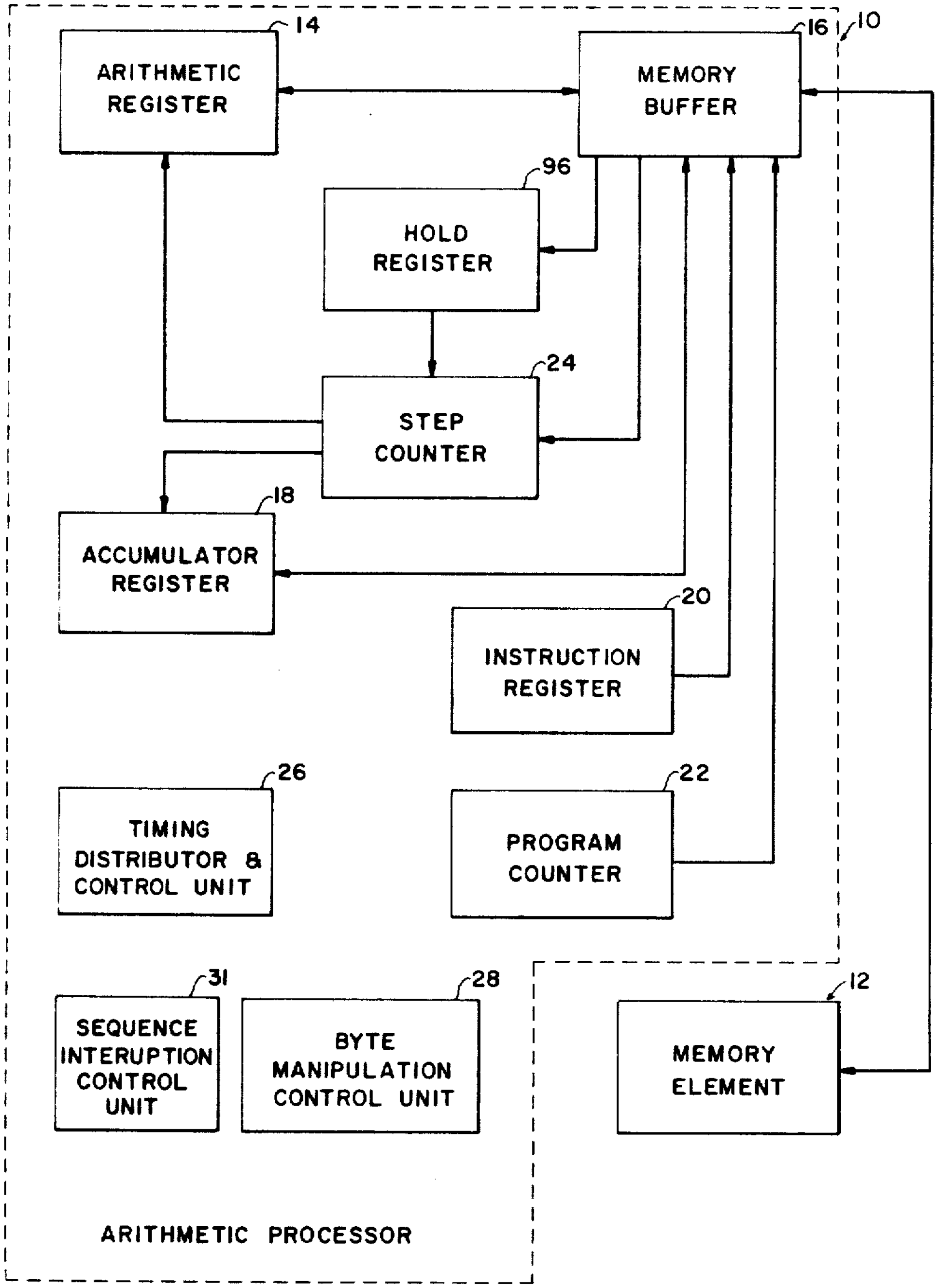
FIGURE 1 is a schematic block diagram of a digital data processing system illustrating features of the invention.
Figure 5:
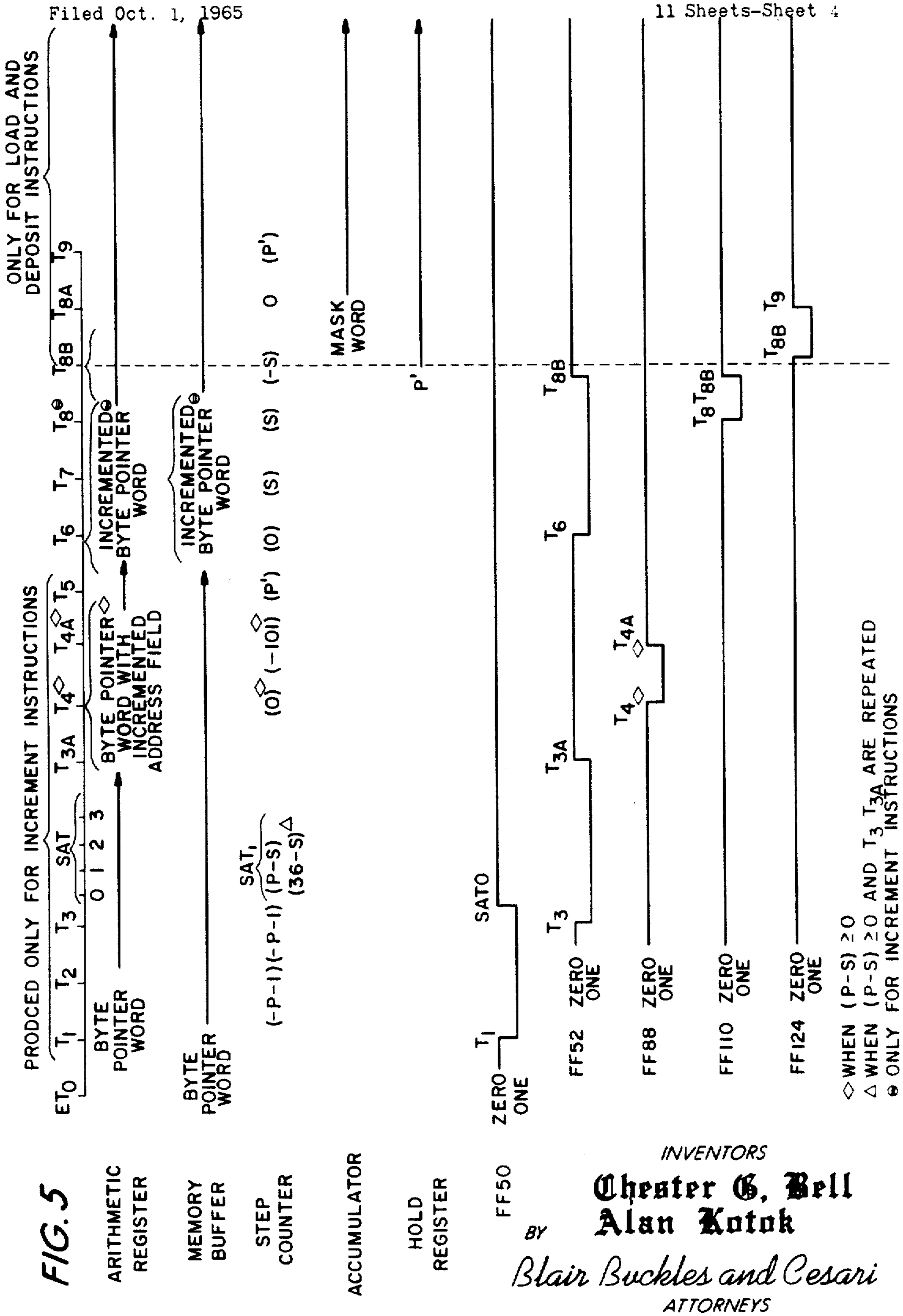
Figure 6:
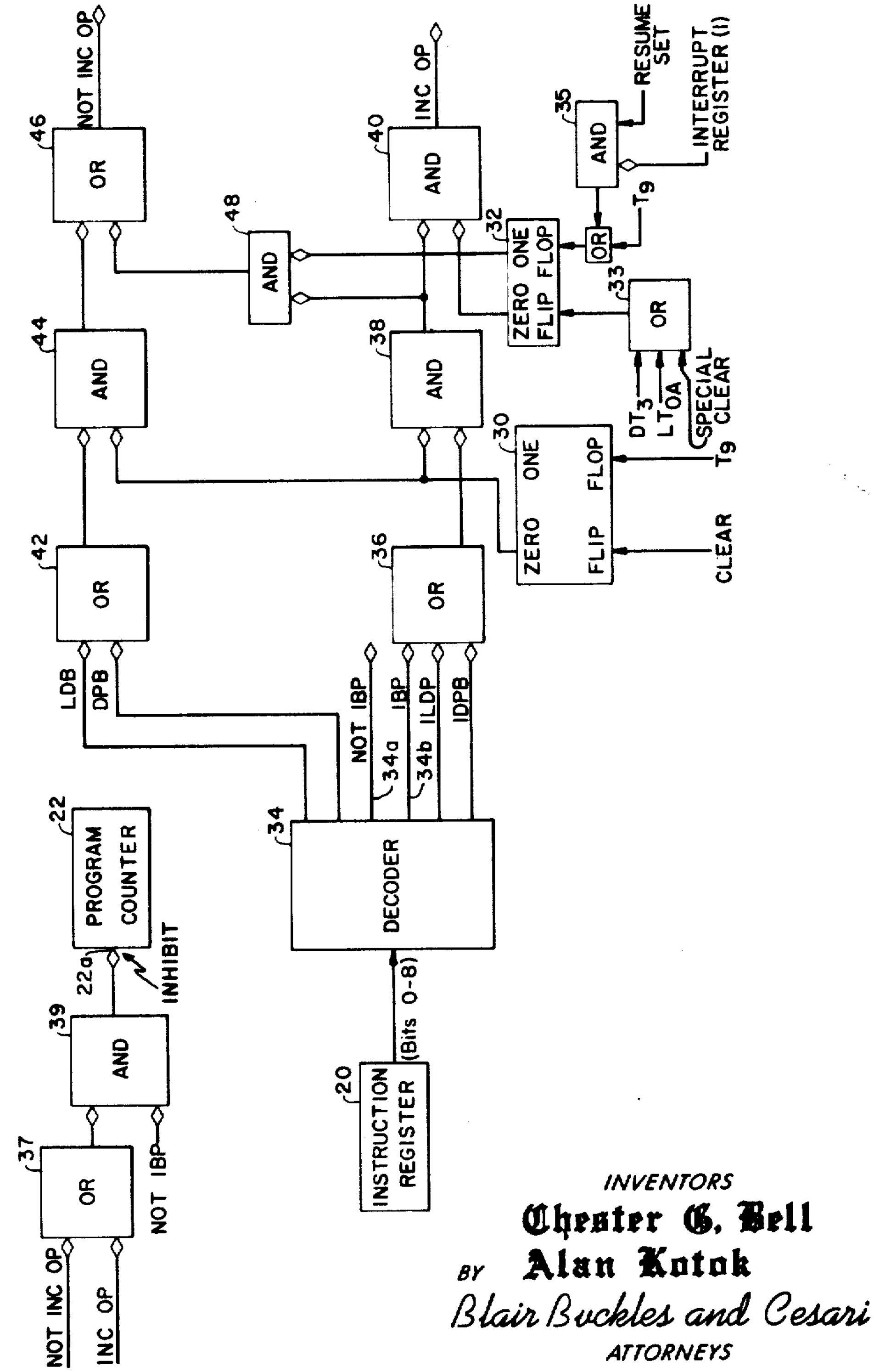
Figure 7:
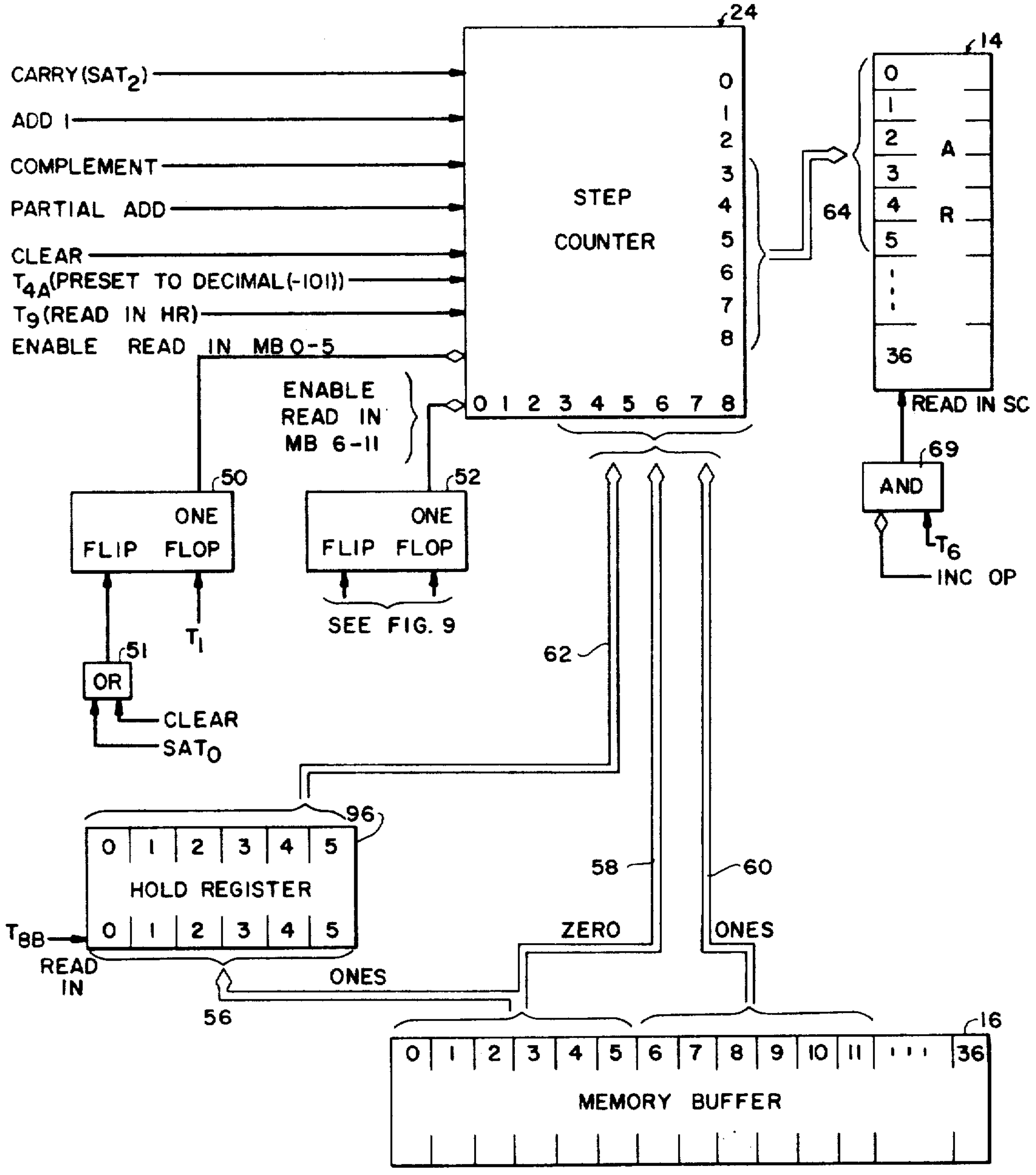
Figure 8:
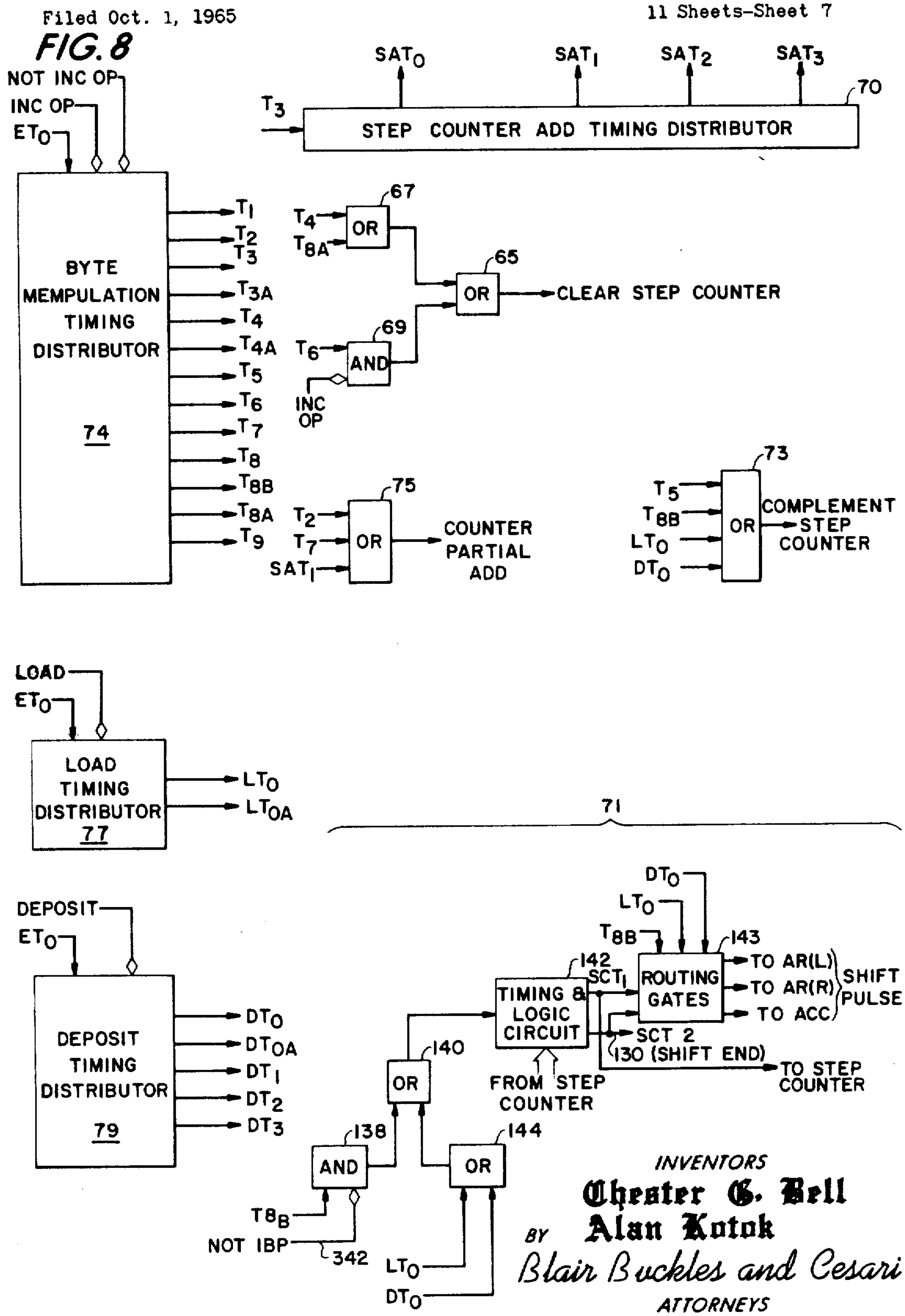
Figure 9:
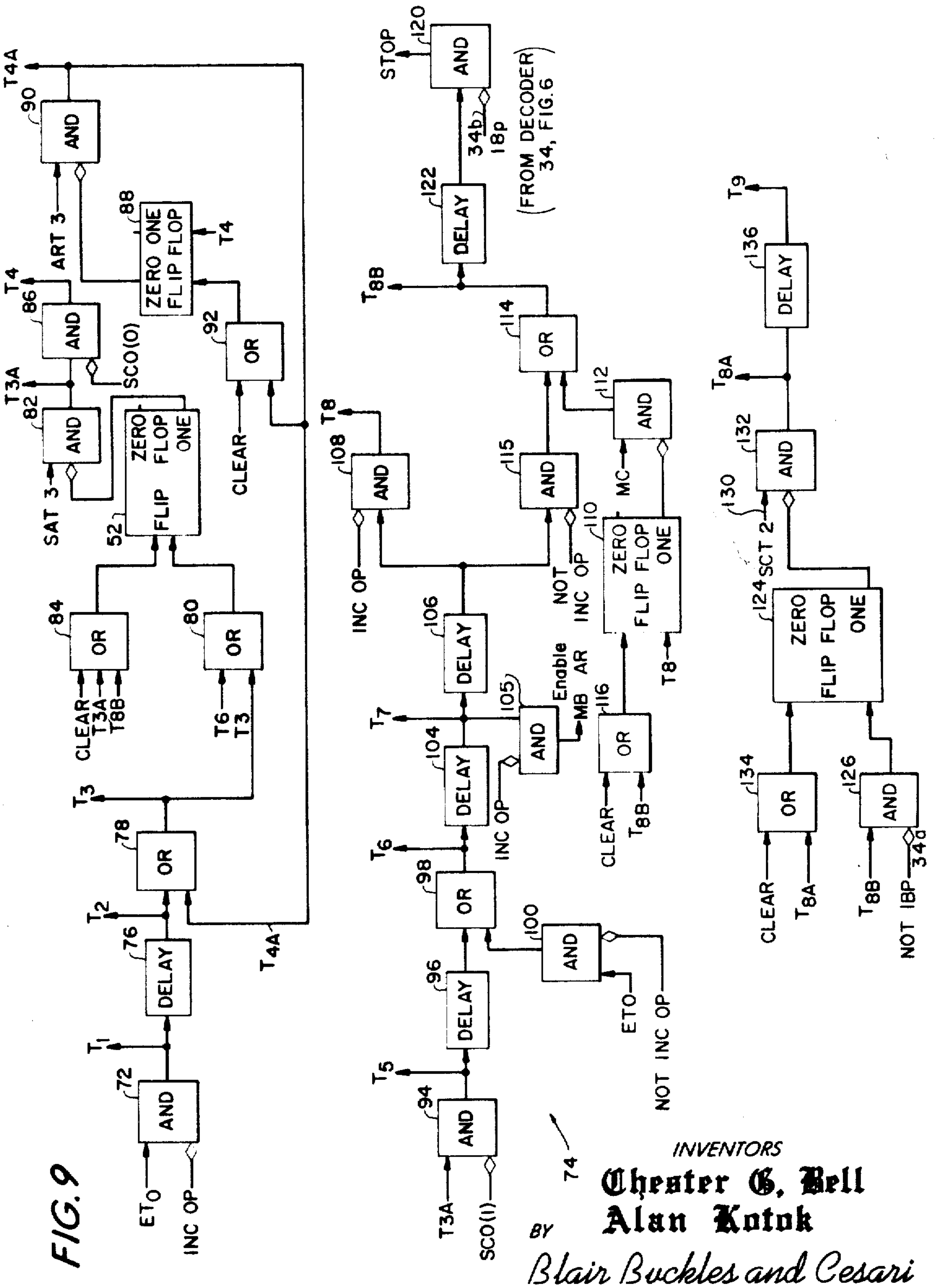
Figure 10:
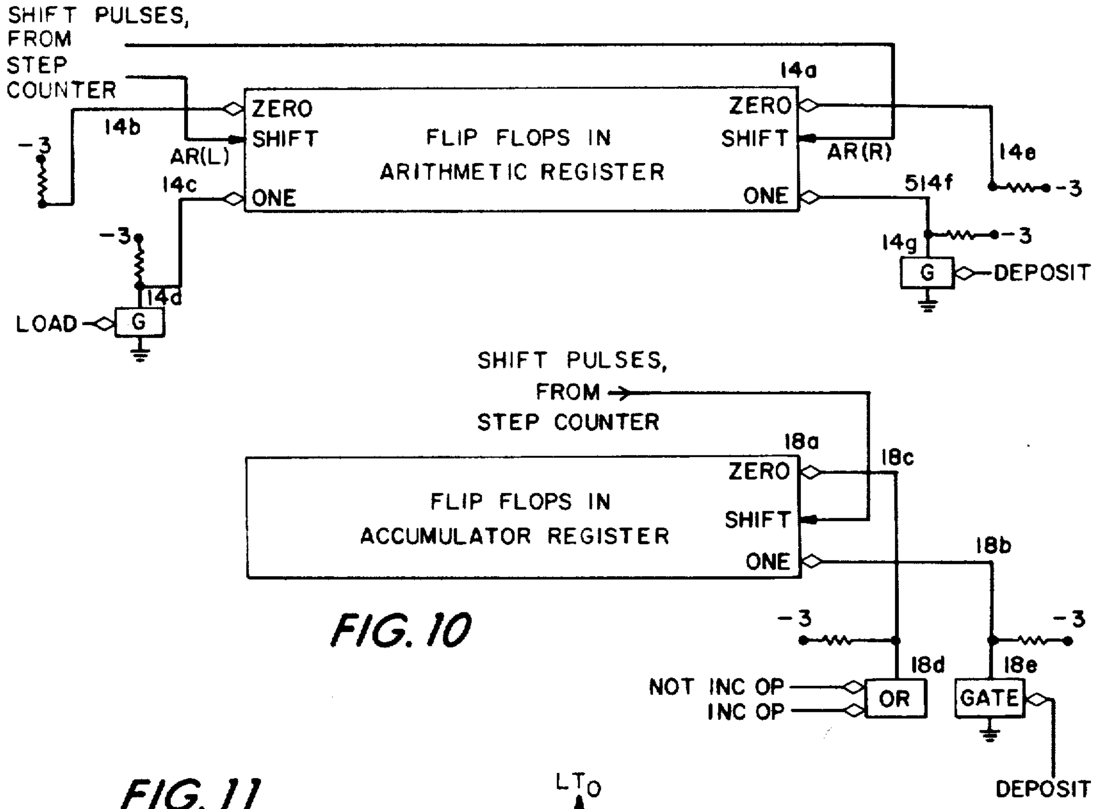
Figure 11:
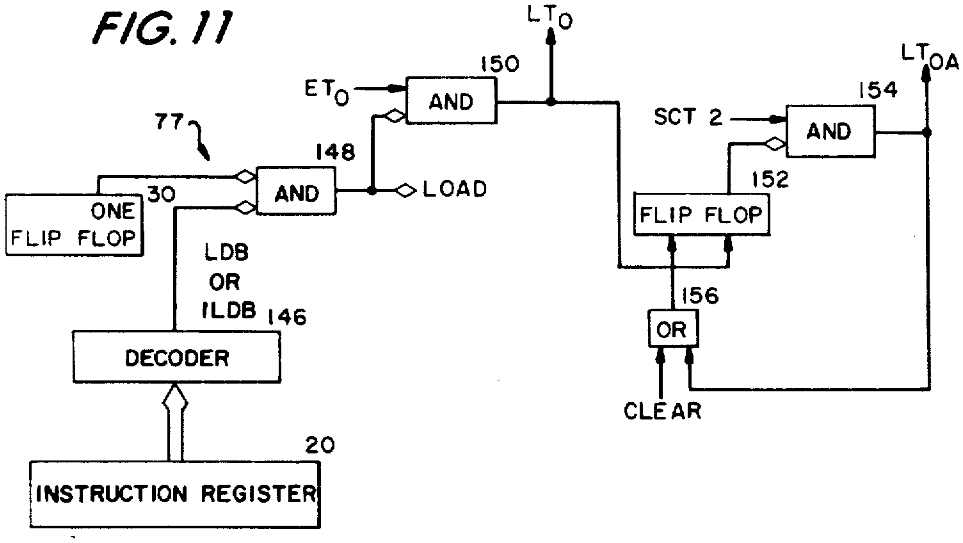
Figure 13:
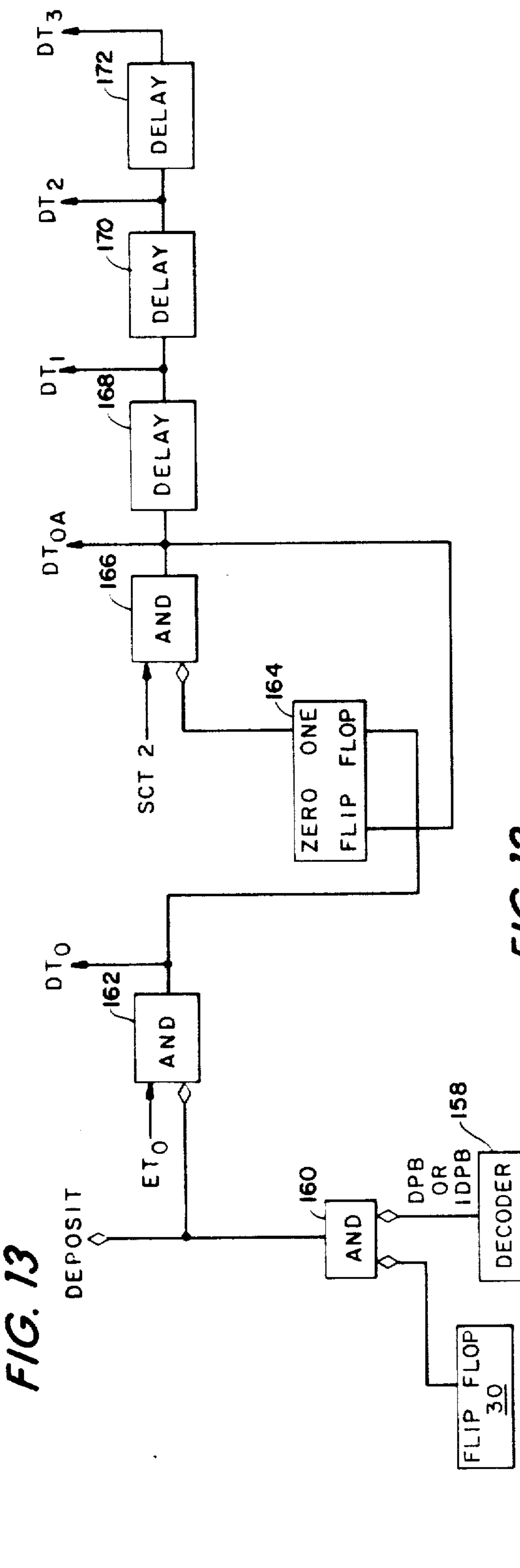
Figure 12:
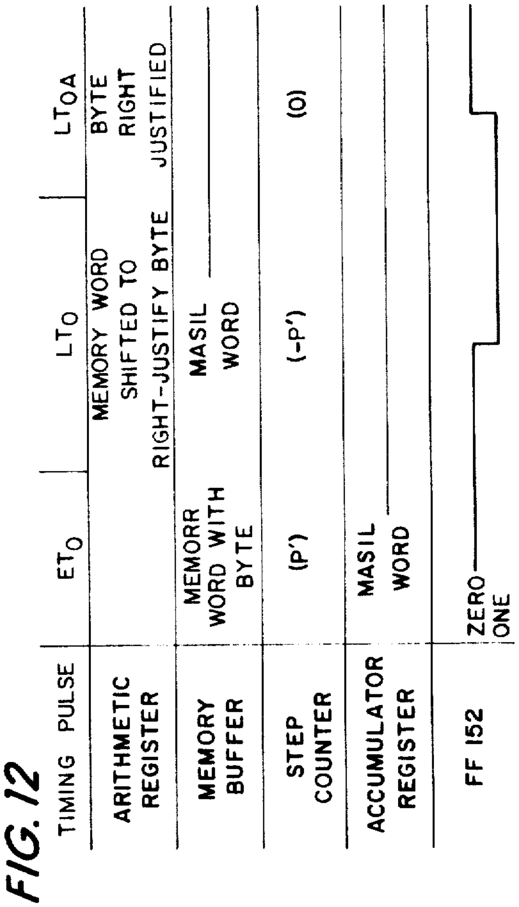

FIGURES 4A and 4B, respectively, show an instruction word format and a byte pointer word fromat suited for use in the data processing system of FIGURE 1;

FIGURE 5 is a timing chart for the execution cycle in the first sequence of a byte manipulation;

FIGURE 6 is a diagram of a circuit developing command signals that control circuits performing byte manipulation operations;

FIGURES 7 and 8 show gating circuits and registers operating in conjunction with the step counter in accordance with the invention;

FIGURE 9 is a diagram of a logic and timing circuit for incrementing a byte pointer word and for producing a mask word in accordance with the invention;

FIGURE 10 shows the gating circuits controlling the shift operations of the arithmetic register and of the accumulator register in the system of FIGURE 1;

FIGURE 11 is a diagram of the logic circuit for executing a "load byte" instruction;

FIGURE 12 is a timing chart for the execution cycle in the second sequence of a load byte instruction;

FIGURE 13 is a diagram of the logic circuit for executing a "deposit byte" instruction; and FIGURES 14A–14F form a table showing the contents of several registers at each step in executing a deposit byte instruction.

In brief, the apparatus of this invention executes a byte manipulation operation when an instruction word calling for a byte manipulation is read into the instruction register of the data processing system. The instruction signals that a byte operation is to be performed, identifies the kind of byte operation, and provides the address in memory of a byte pointer word.

The pointer word, in turn, contains the address in memory of either the data word containing the byte to be operated on or the data word into which a byte is to be written. The pointer word also identifies the size of the byte and its location in the data word.

Circuits for executing three byte manipulation instructions are described in detail. In one, termed a load byte instruction, the specified byte is extracted from a data word and loaded into the end stages of a register; all the register stages not used by the byte contain a selected digit, such a binary ZERO. The selected byte is then accessible for processing according to conventional digital arithmetic operations. The other bytes in the data word are not altered by the load byte operation.

A deposit byte instruction causes a byte to be inserted in a specified position in a data word stored at a specified memory location. Again, the other bytes in the data word are not disturbed by the operation.

In executing the above load byte and deposit byte instructions, the apparatus of the invention develops a "mask word" consisting of a selected digit in each digit position in the data word which is not occupied by the byte being processed. The mask word is used to protect the digits of the data word which are outside of the specified byte.

A third byte operation that the system is well suited for carrying out is to increment the byte pointer word. This instruction makes it possible to execute load byte and deposit byte instructions for bytes having successive locations in memory with a minimal number of operations and instructions and hence with minimal time.

Turning to FIGURE 1, a digital computing system embodying the invention includes an arithmetic element having an arithmetic processor indicated generally at 10 and a memory element 12. The illustrated arithmetic processor includes an arithmetic register 14 connected by a data path with a memory buffer 16 that communicates with the memory element 12. The processor 10 also has an accumulator register 18 connected through a data path with the memory buffer 16. With this arrangement, where, to minimize cost, there is no direct data path between the arithmetic register and the accumulator register data in the accumulator register that is to be transferred to the arithmetic register is first transferred to the memory buffer 16 and then transferred from the memory buffer to the arithmetic register.

The illustrated arithmetic processor 10 also includes such other conventional registers as an instruction register 20, a program counter 22 and a step counter 24. Further, a hold register 96 provides intermediate storage for numbers being transferred between the memory buffer and the step counter. An execution timing distributor and control unit 26 produces timing signals used in carrying out address, fetch and execution cycles.

Figure 2:
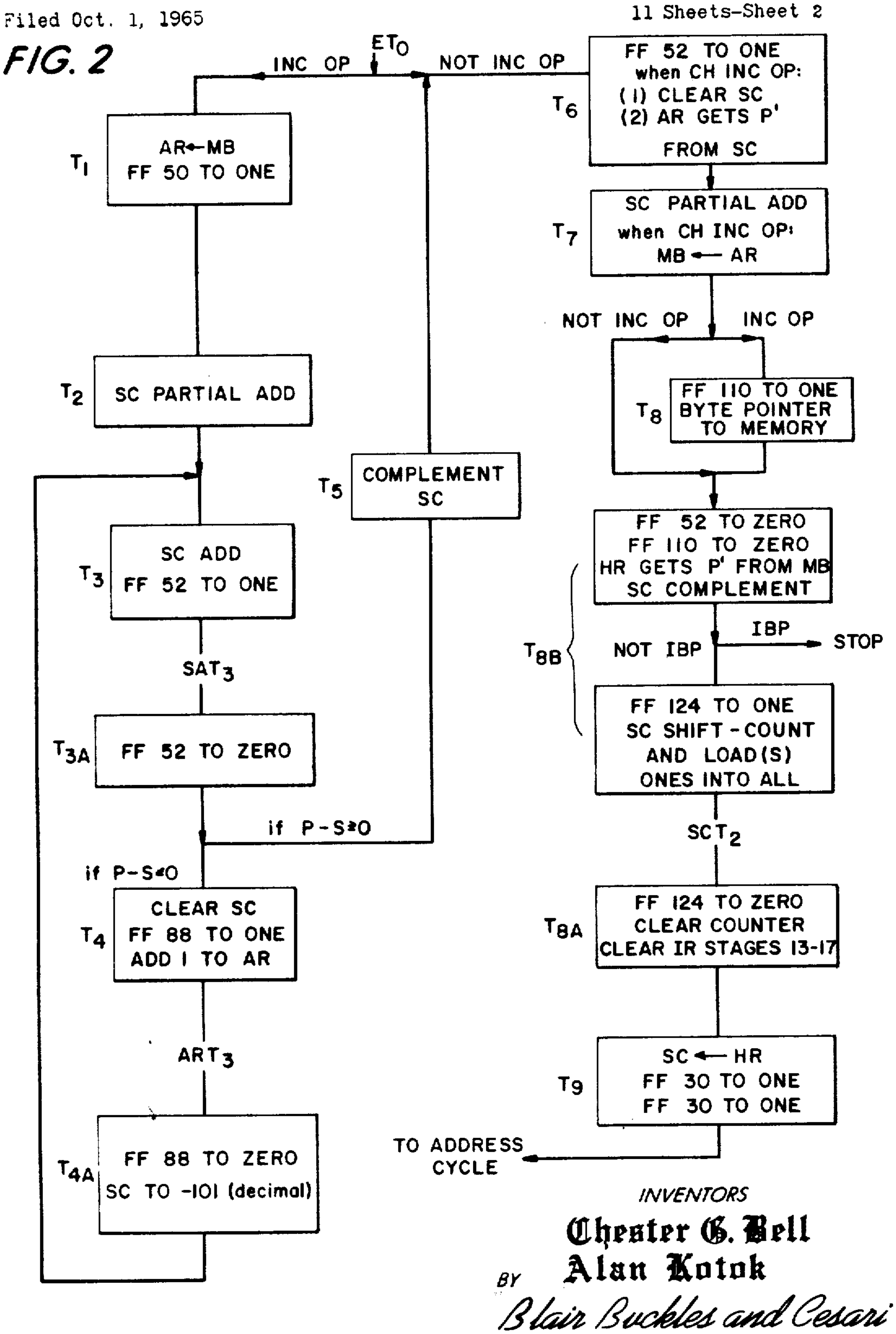

A byte manipulation control unit 28 contains timing, gating, decoding and other logic circuits provided by the invention. The connections between the unit 28 and the other elements of the data processing system of FIGURE 1 are shown in other figures and described in the ensuing discussion. Details of the circuits in the unit 28 and the cooperating circuits in other elements of the processor 10 are described below with reference to FIGURES 6 through 12. FIGURES 2 and 3 are flow charts and FIGURES 5, 12 and 14 are timing diagrams of logic operations illustrating the operation of the byte control circuits in the system of FIGURE 1.

The logic circuits shown in FIGURE 1 are recited in abbreviated form in the flow charts and timing charts. The following abbreviations are used:

| | |
|---|---|
| Arithmetic Register **14** | AR |
| Memory Buffer **16** | MB |
| Accumulator Register **18** | ACC |
| Step Counter **24** | SC |
| Hold Register **96** | HR |

Also, flip-flops are abbreviated in the charts and drawings as FF.

Before describing these circuits of FIGURE 1 and their operation, the format of instruction and byte pointer words for use with the illustrated logic will be described with reference to FIGURES 4A and 4B. A byte pointer word is a three-part number that specifies the address in memory of a particular byte.

INSTRUCTION WORD FORMATS

The data processing system shown on FIGURE 1 illustratively operates with a 36-bit instruction word having the format shown in FIGURE 4A. The first nine bits (bits 0 to 8, starting from the left) are a binary number identifying the instruction to be performed, and bits 9 through 12 specify the accumulator to be used in carrying out the instruction. The remaining bits 13 through 35 constitute an address field containing information for calculating the address in the memory element of a word to be operated on in carrying out the instruction. The system of FIGURE 1 computes this address during an address cycle that forms no part of the present invention.

A byte manipulation of the kind under consideration here is initiated when the instruction register 20, FIGURE 1, receives an instruction word in which bits 0 to 8 identify one of the following byte manipulation instructions:

A. Increment Byte Pointer (IBP).—This instruction increments a byte pointer word to the address of the next successive byte in the memory element.

B. Load Byte (LDB).—A load byte instruction extracts a specified byte from a specified memory word and loads it into the arithmetic register 14.

C. Deposit Byte (DPB).—A deposit byte instruction stores a byte that is in the arithmetic register in a specified location in the memory element.

D. Increment the Byte Pointer and Load the Byte (ILDB).—This is a two-part instruction in which the byte pointer word is incremented and then the byte identified by the incremented pointer word is loaded into the arithmetic register.

E. Increment the Byte Pointer and Deposit the Byte (IDPB).—This is another combined instruction calling for the byte pointer to be incremented and for the byte in the arithmetic register to be stored in the memory location specified by the new byte pointer word.

When the instruction part (digits 0–8) of the instruction word identifies any one of the foregoing byte manipulation instructions, the address field (bits 13–35) of the instruction word contains information for determining the address in memory of a byte pointer word.

FIGURE 4B shows the format of the pointer word. Bits 12–35 of this word constitute an address field. In particular, in the illustrated arrangement, when bits 13–17 are all ZERO, the number comprising bits 18 through 35 is the address in memory of the word to be used in the byte operation. When bits 13–17 are not ZERO, the address of the word to be used in the byte operation is computed using bits 13–35.

The number in the P field of the pointer word, bits 0–5, specifies the number of bits between the right end of the memory word and the farthest right bit of the byte. Thus, the P number locates the byte within a memory word. The S field of the pointer word, bits 6–11, is a number specifying the size of the byte, up to 36 bits. Thus, the byte pointer word contains the complete address of a byte, i.e. the byte is located in bits (36–P–S) through (36–P) in the word stored at the memory address specified by the address field.

When the byte pointer word is incremented according to the invention, the P number is diminished by the S number, thereby specifying the next byte to the right in the memory word specified by the address field. When the P number has thus been "moved" all the way down the memory word to its right end, the next increment operation changes the pointer word address field (bits 13–35) to identify the next word in memory and resets the P number to specify the left-most byte in the latter word.

DOUBLE-CYCLE MONITOR

The illustrated byte manipulation control unit 28, FIGURE 1, is arranged to execute the load and deposit operations described above with two successive sequences of the data processing system, each sequence including, in succession, an address cycle, a fetch cycle and an execution cycle. However, an instruction in which only the pointer word is incremented, and in which there is no byte deposit or load operation, is carried out in a single sequence of address, fetch and execution cycles.

Further, the illustrated data processing system can be interrupted between the two sequences. As shown in FIGURE 6, a flip-flop 30 is provided to keep track of which of the two sequences is being performed, and a flip-flop 32 controls the reexecution of the first sequence when resuming operation after an interruption between the sequences.

The flip-flop 30 is switched to ZERO by a clear pulse developed in the FIGURE 1 timing and control unit 26 at the beginning of every new instruction. Thus, this flip-flop is in the ZERO state at the beginning of a byte operation. It remains in this state until set to ONE by a $T_9$ timing pulse, the last timing pulse developed during the first sequence of a byte operation. It then remains set to ONE throughout the second sequence until cleared to ZERO by the clear signal for the next instruction. The status of the flip-flop 30 does not need to be stored in the event of an interruption.

The flip-flop 32, as shown in FIGURE 6, is placed in the ZERO state by a special clear signal developed in the FIGURE 1 timing and control unit 26 at the point during execution of the second sequence of a byte manipulation when an interruption can no longer occur. An OR circuit 33 applies the special clear pulse to the flip-flop 32.

The flip-flop 32 is set to ONE by the $T_9$ pulse at the end of the first sequence of a byte operation and remains in this state until cleared to ZERO by the last timing pulse, designated $DT_3$ for a deposit operation and $LT_{OA}$ for a load operation, produced in a two-sequence byte operation. (As noted above, an increment-only operation is performed in a single sequence.)

Further operation of the flip-flop 32 occurs when a byte operation is interrupted. This can occur at the end of the first of the two sequences. In order to interrupt a byte instruction, the arithmetic processor 10, FIGURE 1, also has a sequence interruption control unit 31. This unit senses an interruption request in a second program different from the first program the system is processing and compares the priority of the programs. When the second program has a higher priority than the first, the control unit 31 produces signals that interrupt the first program, and stores the status of the first program, including the state of the flip-flop 32, in interruption registers within the control unit 31 or in the memory element 12.

When the interrupted first program again has top priority, its status is transferred back to the processor 10 and operation on this program is resumed. Interruption of this nature is now well known to those skilled in the art, and is described, for example, in United States Patent No. 3,079,082.

The illustrated sequence interruption control unit 31 causes the arithmetic processor 10 also to produce the special clear signal, applied to the FIGURE 6 OR circuit 33, when the data processing system is ready to resume operating in an interrupted program, i.e. immediately prior to reloading the arithmetic processor with the status of the interrupted program at the time it was interrupted. The sequence interruption control unit 31 then produces a resume set signal that gates the status back into the system. As shown in FIGURE 6, the resume set signal is applied to an AND circuit 35 whose output signal switches the flip-flop 32 to ONE when the interruption register storing the status of this flip-flop contains a ONE.

Thus, when an interruption occurs, the status of the flip-flop 32 is then in the same state as when the byte "Interruption Register 1." When the interrupted program is to be resumed, the special clear pulse clears the flip-flop 32 to ZERO, and the subsequent resume set pulse enables the AND circuit 35 to set the flip-flop to ONE when the Interruption Register 1 contains a ONE. The flip-flop 32 is then in the same state as when the byte operation was interrupted.

As will become more apparent hereafter, with the foregoing arrangement of the flip-flops 30 and 32, upon resuming an interrupted byte operation, the flip-flop 32 causes the data processing system to repeat the execution cycle of the first sequence only to the extent of retrieving the byte pointer word. It prevents the pointer word from being incremented, which would normally occur when an increment instruction is being processed.

INCREMENT (INC) COMMAND CIRCUIT (FIGURE 6)

The first sequence of address, fetch and execution cycles is used for executing each illustrated byte instruction. However, non-incrementing instructions, i.e. LDB and DPB instructions, require fewer operations during the first sequence than do the incrementing instructions. Accordingly, prior to commencing the execution cycle of the first sequence, the kind of byte instruction is identified and either an increment operation or a not increment operation signal is produced to control the ensuing first sequence. Further, when the system is resuming operation on any byte instruction following an interruption, the not increment operation signal is generated prior to commencing the first sequence.

The manner in which these signals are produced is now discussed with reference to FIGURE 6. A decoder 34 is connected with stages 0–8 of the instruction register 20, i.e. the stages storing the instruction-identifying number, to receive the instruction-identifying bits of the instruction words (FIGURE 4). The decoder has one output line for each of the byte manipulation instructions set forth above, i.e. LDB, DPB, IBP, ILDB and IDPB. When the instruction register 20 stores one of these byte manipulation instructions, the decoder 34 energizes its output line associated with that instruction. The decoder also has an output line 34*a* that is energized whenever any output line other than the IBP line is energized, i.e. when the instruction register contains any byte instruction other than the IBP (increment only) instruction.

An OR circuit 36, also shown in FIGURE 6, receives the three decoder output lines associated with increment instructions, that is, the IBP, ILDB and IDPB instructions. The circuit 36 thus develops an output signal whenever the instruction register 20 receives an instruction that is to increment the byte pointer word.

An AND circuit 38 receives the output signal from the OR circuit 36 and is also connected with the flip-flop 30 to receive an assertion level signal when that flip-flop is in the ZERO state. The AND circuit 38 then develops an increment (INC) signal when an increment instruction is called for and when the flip-flop is in the ZERO state, which occurs when the system is ready to perform and when it is performing the first sequence of a byte operation.

With further reference to FIGURE 6, the INC signal from the AND circuit 38 is applied to an AND circuit 40 that is enabled when the flip-flop 32 is in the ZERO state. In response to these input signals, the AND circuit 40 develops an increment operation (INC OP) signal. This signal is thus developed only when all conditions for incrementing the byte pointer word are present and it is used, as described below, to initiate this operation.

Note that when the system has completed the first sequence of a byte instruction and has then been interrupted, upon resuming operation, the flip-flop 32 is always in the ONE state. It thus does not enable the AND circuit 40. Hence, in this condition, the INC OP signal cannot be generated, regardless of the kind of byte instruction to be processed.

The output lines from the decoder 34 which are energized when the instruction register 20 contains a byte operation not involving incrementing the pointer word, i.e. when a load byte (LDB) instruction or a deposit byte (DPB) instruction is to be performed, are applied to an OR circuit 42, the output of which is fed to an AND circuit 44 enabled by the ZERO condition of the flip-flop 30. The output of the AND circuit 44 is applied to one of two input terminals of an OR circuit 46. The other input signal to the OR circuit 46 is developed in an AND circuit 48 in response to the coincidence output from the AND circuit 38 and the ONE state in the flip-flop 32. The output signal from the OR circuit 46 is termed a not increment operation (NOT INC OP) signal.

Thus, the NOT INC OP signal, a level, is developed when the instruction register contains either a load or a deposit byte instruction and when the flip-flop 30 is in the ZERO state or when the INC signal is present and the flip-flop 32 is in the ONE state. (The latter condition occurs whenever the system resumes operation following an interruption.) When the NOT INC OP signal is developed, the data processing system does not increment the byte pointer word.

The foregoing operation whereby either an INC OP signal or a NOT INC OP signal is generated takes place substantially instantaneously after an instruction word is loaded into the instruction register 20, and is completed before the timing distributor and control unit 26 of FIGURE 1 develops the first execution cycle timing pluse, designated $ET_0$. Thus, at the execution time $ET_0$ of the data processing system of FIGURE 1, when a byte instruction has been loaded into the instruction register, the circuit of FIGURE 6 has developed either an INC OP signal or a NOT INC OP signal.

The program counter 22 (FIGURE 1) is normally advanced by one count with the $ET_0$ pulse. However, this operation is inhibited during the first sequence of all two-sequence byte operations. Specifically, as shown in the upper left portion of FIGURE 6, an OR circuit 37 receives the NOT INC OP and the INC OP signals. An AND circuit 39 receives the NOT IBP signal on the decoder output line 34*a* and the output signal from the OR circuit 37. The AND circuit output terminal is connected to an inhibit terminal 22*a* on the program counter 22. Accordingly, the program counter is inhibited from being advanced to the next instruction when either the NOT INC OP signal or the INC OP signal is present and the NOT IBP line is energized. Thus, for any byte instruction save IBP, the program counter contains the same number for two operating sequences.

STEP COUNTER OPERATION

The step counter 24 of FIGURE 1 is used in carrying out operations initiated by both the INC OP and the NOT INC OP signals. The gating circuits that control the step counter and the registers that operate with it will now be described with reference to FIGURES 7 and 8.

As indicated in FIGURE 7, the memory buffer 16 is a flip-flop register for storing 36 binary digits; each flip-flop stores one digit and has a ZERO output terminal and a ONE output terminal. (The number present at the ZERO output terminal is the one's complement of the number stored in the flip-flops.)

The ONE outputs of the memory buffer flip-flops storing bits 0 through 5 are applied by a buss 56 to the hold register 96. A buss 58 connects the ZERO outputs of these memory buffer flip-flops to the step counter 24, and a buss 60 connects the ONE outputs of the memory buffer flip-flops storing bits 6–11 to the step counter.

The hold register 96 reads in the number applied to it by buss 56 in response to a timing pulse $T_{8B}$, and applies the number it stores to the step counter via a buss 62.

The step counter 24 is a 9-stage flip-flop counter in which stages 1 through 8 store a binary number and stage 0 stores the digit indicating the sign of the number.

The counter performs arithmetic operations in two's complement logic on one's complement numbers. As indicated in FIGURE 7 on the left side of the step counter, it receives signals that clear the flip-flops therein, that cause a partial add operation to be performed, and that complement the number in the counter. Other signals cause the counter to add 1 to the number it stores and to perform a carry operation.

Gating circuits (not shown) in the step counter apply the number on any one of the busses 58, 60 and 62 to the flip-flops therein. Specifically, in response to a $T_9$ pulse, the step counter reads in the number stored in the hold register 96. The step counter is enabled to read the ZEROS in the memory buffer stages 0–5, i.e. the one's complement of the number in these stages, on the buss 58, when a flip-flop 50 is in the ONE condition. Also, when a flip-flop 52 is in the ONE condition, the step counter is enabled to read in the ONES in the memory buffer stages 6–11, applied to it by the buss 60. When, for example, the flip-flop 52 is in the ONE state, in response to a partial add signal, the step counter performs an exclusive OR operation with the number in the memory buffer stages 6–11 and the number already in the counter. The carry operation for completing a full add operation is executed only when a carry signal is also applied to the counter.

With further reference to FIGURE 7, the arithmetic register 14 is a 36-bit flip-flop register. A buss 64 applies the number stored in the step counter to bits 0–5 of the arithmetic register, which reads in the number in response to the signal an AND circuit 69 produces when it receives a $T_6$ timing pulse while being enabled with the INC OP signal.

FIGURE 8 shows, on the left side of the drawing, a byte manipulation timing distributor 74 that develops a sequence of pulses $T_0$–$T_9$ used in the first sequence of a byte operation. A load timing distributor 77 develops the two LT pulses required for the second sequence of a byte load operation and a deposit timing distributor 79 develops a sequence of five DT pulses for carrying out the second sequence of a byte deposit operation. The timing distributor 74 is shown in detail in FIGURE 9 and FIGURES 11 and 12, respectively, show the details of the timing distributors 77 and 79.

The control signals applied to the step counter 24, as shown at the upper left side of FIGURE 7, are developed with the logic circuits shown on the right in FIGURE 8. The step counter 24 clear signal is a pulse developed with an OR circuit 65 that is energized by a $T_4$ or pulse, by a $T_{8A}$ pulse, both applied to an OR circuit 67, or by the coincidence of a $T_6$ pulse and the INC OP signal, both of which are applied to an AND circuit 69.

As also shown in FIGURE 8, an OR circuit 73 develops the step counter complement pulse in response to any one of the $T_5$, $T_{8B}$, $LT_0$, $DT_0$ pulses. The counter partial add signal, which causes a partial add operation in the step counter 24, is developed with an OR circuit 75 that responds to any one of the $T_2$, $T_7$, or $SAT_1$ timing pulses. A step counter add timing distributor 70 responds to the $T_3$ pulse from the byte manipulation distributor 74 to develop a sequence of pulses $SAT_0$, $SAT_1$, $SAT_2$ and $SAT_3$. In response to these pulses, the step counter 24 (FIGURE 7) performs an ADD operation. With the illustrated equipment, this is done by applying the $SAT_0$ pulse through an OR circuit 51, FIGURE 7, to clear the flip-flop 50. The next pulse $SAT_1$, is applied to the OR circuit 75, shown in FIGURE 8, to produce the step counter partial add signal. Thereafter, the $SAT_2$ pulse is applied to the carry input of the step counter (FIGURE 7). The $SAT_3$ pulse signals that this subroutine is done.

The shift and count timing circuit at the bottom of FIGURE 8, indicated generally at 71, is described below.

INCREMENTING THE BYTE POINTER WORD-INITIAL OPERATION

As will now be described, to store bytes in successively-addressed word locations in memory and, alternatively, to retrieve bytes from successively-addressed word locations in memory with a minimal number of operations, and hence in a brief time, the invention provides logic circuits for incrementing the address information in the byte pointer word. These circuits first subtract the (S) number (bits 6 through 11, FIGURE 5) in the pointer word from the (P) number (bits 0 through 5, FIGURE 4B).

When the resultant number is positive, including zero, the next byte to be processed is in the word at the memory address specified in the address field of the pointer word and is located therein starting at the digit (P–S) digits from the right end of that word. Accordingly, the number (P–S) resulting from the subtraction operation replaces the original (P) number in the pointer word, so that the pointer word now designates the next byte to the right in the memory word.

When (P–S) is negative, however, there is insufficient room in the memory word addressed by the pointer word address field (bits 11 through 35) for another byte. The logic circuits then increment the pointer word address field by one to the next memory location and store (36–S) in the position field of the pointer word. The pointer word thus incremented specifies the address of the first, left-most, byte in the word at the new memory location.

Assume now that a byte manipulation instruction is read into the instruction register 20 of FIGURE 1. As it does for every instruction read into the instruction register, the data processing system performs an address cycle wherein it calculates the address called for by the address field (bits 13–35, FIGURE 4) of the instruction word. The data processing system then performs a fetch cycle wherein it reads out from the memory element 12, FIGURE 1, the word stored at the calculated address and loads this word into the memory buffer 16. Where the instruction in the instruction register 20 calls for a byte operation, the word read from the memory element is a byte pointer word. Thus, during the address and fetch cycles, the circuit of FIGURE 6, discussed above, is responding to the instruction code portion (bits 0–5) of the instruction word in the register 20, and the computing system is reading into the memory buffer 16 the byte pointer word addressed in the instruction.

When the instruction word in the register 20 calls for a byte manipulation that includes the increment subroutine, the FIGURE 6 circuit develops the INC OP level as described above.

Assume that the status of the computing system is such that the INC OP level is present and that a byte pointer word is stored in the memory buffer 16, FIGURE 1. As shown in the FIGURE 9 detailed schematic of the byte manipulation timing distributor 74, which is also shown in block form in FIGURE 8, an AND circuit 72 receives the $ET_0$ timing pulse from the timing distributor and control unit 26 of FIGURE 1 at the same time that it is being enabled by the INC OP level. In response to these two signals, the AND circuit 72 develops a timing pulse designated $T_1$. Continued reference should now be made to the timing chart of FIGURE 5.

As indicated in FIGURE 2, which is a flow chart of operations performed during the first sequence of a byte manipulation, in response to the $T_1$ timing pulse, the arithmetic register 14 (AR) of FIGURE 1 receives by a conventional jam or parallel transfer the pointer word stored in the memory buffer 16 (MB). (The FIGURE 2 designation AR←MB thus means that the arithmetic register receives the contents of the memory buffer.) As also indicated in FIGURE 2, the $T_1$ pulse sets the flip-flop 50 (FIGURE 7) to the ONE state, thereby enabling the step counter gates that read in the one's complement of the pointer word number (P) applied to the counter by buss 58.

After being delayed in a delay circuit 76, FIGURE 9, the timing distributor 74 develops a timing pulse $T_2$. As shown in FIGURE 8, this pulse is applied to the OR circuit 75 thereby generating the step counter partial add signal. In response to this signal from the OR circuit 75, the step counter is preset with the one's complement of the (P) number of the byte pointer word, i.e. with (–P–1). This operation is summarized in FIGURE 2 with the notation that the $T_2$ pulse initiates a step counter partial add operation.

The $T_3$ pulse, developed as shown in FIGURE 9 from an OR circuit 78 energized by the $T_2$ pulse, is applied to the ONE input terminal of the flip-flop 52 (shown in FIGURE 9 and for convenience, also in FIGURE 7) by way or an OR circuit 80 (shown only in FIGURE 9). The ONE output level from the flip-flop 52 enables an AND circuit 82 in the timing distributor 74 (FIGURE 9).

Referring to FIGURE 7, the ONE output level from the flip-flop 52 also enables the counter 24 to read in the number in stages 6 through 11 of the memory buffer 16, this is the number in the (S) field of the pointer word. This function of the timing pulse $T_3$ is shown in FIGURE 2 with the designation that it sets the flip-flop 52 to the ONE condition.

As also indicated in the flow chart, the $T_3$ pulse initiates a step counter add operation. This is achieved as shown in FIGURE 8 by applying the $T_3$ pulse to the step counter add timing distributor 70.

As shown in FIGURE 7, the first pulse from the timing distributor 70, the $SAT_0$ pulse, is applied through an OR circuit 51 and switches flip-flop 50 to the ZERO condition. The next pulse, $SAT_1$, produces a step counter partial add instruction signal from the FIGURE 8 OR circuit 75. In response to this instruction and the (S) number from memory buffer bits 6–11, the step counter executes a partial add operation of the complement of the (P) number already in the counter 66 and the (S) number. Thereafter, the $SAT_2$ timing pulse executes a conventional carry operation in the step counter. The step counter 24 now stores the sum of the (S) number and the complement of the (P) number. As is well known, this logic operation subtracts the (P) number from the (S) number so that the counter 24 is in fact now storing the quantity (S–P–1). The number zero stage of the step counter, designated SCO, stores the bit designating the sign of this number. The sign bit is ZERO (designated SCO(0)) when this number is positive, excluding zero.

As shown in FIGURE 9, the last pulse ($SAT_3$) from the timing distributor 70 of FIGURE 8 is applied to another input of the AND circuit 82 and, since flip-flop 52 is still in the ONE condition, causes the AND circuit to develop the next timing pulse, $T_{3A}$. As indicated in the chart of FIGURE 2, this pulse clears the flip-flop 52 to ZERO. This is done as shown in FIGURE 9, by applying the $T_{3A}$ pulse to an OR circuit 84 whose output terminal is connected to the zero input terminal of the flip-flop 52. The effect of this operation is, referring to FIGURE 7, to remove the enable signal for memory buffer bits 6–11 from the step counter. (The OR circuit 84 also receives the CLEAR pulse to clear the flip-flop 52 at the same time as the flip-flop 30 in FIGURE 6.)

When the (S) number is less than the (P) number, i.e. when the number of digits between the right side of the pointer word and the right-most digit of the byte specified by the pointer word is more than the size of the byte, the byte having the next successive memory address is located in the same data word as the present byte. Its position, designated (P′) to distinguish it from the position number (P) of the present byte, is (P–S). Incrementing the pointer word in this instance involves changing the position number to (P–S).

However, when the (S) number exceeds the (P) number, the next successively addressed byte is located at the position (36–S) in a new word whose address in memory is obtained by incrementing by ONE the address field of the pointer word in the memory buffer. Thus, both the address field and the position number of the pointer word need to be changed to increment the pointer word when (S–P) is positive.

These alternative steps are carried out following the timing pulse $T_{3A}$ in the manner now described. As noted above, in the illustrated step counter, the sign digit is ZERO when the step counter stores a number greater than zero, i.e. when (S) exceeds (P–1), so that the address field of the pointer word must be incremented by one to locate the next successive byte address. Referring to FIGURE 9, an AND circuit 86 receives the $T_{3A}$ pulse and is connected with the step counter to receive an assertion level when the sign bit of the counter is ZERO. In response to this ZERO level and to the $T_{3A}$ pulse, the AND circuit develops a timing pulse $T_4$. Reference to the flow chart of FIGURE 2 lists the three operations this timing pulse initiates. First, as shown in FIGURE 8, the pulse is applied through the OR circuits 67 and 65 to develop the step counter clear signal, which resets the counter to ZERO.

The $T_4$ pulse is also applied to the ONE input terminal of a flip-flop 88, shown in FIGURE 9, whose output enables an AND circuit 90.

The third operation initiated in response to the timing pulse $T_4$ is a conventional arithmetic register subroutine that indexes the address field of the pointer word, already stored in the arithmetic register, by one, to develop the memory address of the next data word. The execution of this subroutine does not form part of the present invention and can be done in any of several conventional manners. The end of the subroutine is signalled with a timing pulse illustratively designated as $ART_3$ from the arithmetic register. This timing pulse is applied to the AND circuit 90 in FIGURE 9, already enabled by the flip-flop 88 in response to the $T_4$ timing pulse, to develop a $T_{4A}$ pulse.

As also shown in FIGURE 9, the $T_{4A}$ pulse is applied through an OR circuit 92 to the ZERO input terminal of the flip-flop 88, thereby resetting the flip-flop to the ZERO condition. The OR circuit 92 also receives the CLEAR signal described above as clearing the flip-flop 30 of FIGURE 6.

To locate, i.e. specify the (P) number of the leftmost byte in the new data word, (36–S) must be computed. However, the one's complement of (36–S) is (−37+S), and hence the step counter should be preset to (−37) and then (S) should be added to it. A further factor should, however, be considered. When, due to faulty programming, (S) is greater than (36), (−37) plus this (S) number will still result in ZERO or a negative number in the step counter. The computer will then get "hung up" by continually repeating timing pulses $T_3$, $T_{3A}$, $T_4$ and $T_{4A}$. This is avoided by presetting the step counter not to (−37) but to (−37) plus the number that is one count larger than the largest number that can be stored in the six bits (bits 6–11) of the pointer word (FIGURE 4B) assigned to store the (S) number. Since the largest six-bit binary number is decimal (63), the step counter is therefore preset to decimal (101).

This operation taken to ensure that (P–S) is positive after executing the $T_4$ and $T_{4A}$ pulses only once does not affect the operation of subtracting (S) from (36) to locate the new byte. Specifically, the binary number for the decimal number (101) is formed by adding a ONE to the next most significant position of the binary number for (37). That is, decimal (37) is binary (100101), and decimal (101) is binary (1100101). Therefore, after (S) is subtracted from decimal (101), the rightmost six digits in the resultant binary number are identical to the result obtained from subtracting (S) from decimal (37). For this reason, after processing pulses $T_4$ and $T_{4A}$, only the six rightmost digits in the step counter are used to define the new position number (P′).

Returning to FIGURES 2, 7 and 9, the $T_{4A}$ pulse therefore presets the step counter to the binary equivalent of the decimal number (−101). With further reference to FIGURE 2, the system then repeats then repeats the operations performed in response to the $T_3$ and $T_{3A}$ timing pulses. This is done, as shown in FIGURE 9, by applying the $T_{4A}$ pulse to the OR circuit 78 which develops the $T_3$ pulse.

With the step counter preset to decimal (−101), repeating the operations performed in response to $T_3$ adds the (S) number so that the counter stores (−101+S). (However, the six least significant digits of the seven digit binary number are equal to decimal [−37+S]. The seventh digit has now served its purpose, is no longer used, and will be disregarded in further description.) The step counter number zero stage, contains a positive sign bit, i.e. a ONE. This condition is designated SCO(1) and, as shown in FIGURE 9, the resultant level enables an AND circuit 94 to develop the $T_5$ pulse in response to the $T_{3A}$ pulse. The $T_{3A}$ pulse also clears the flip-flop 52, thereby disabling the data path (FIGURE 7) from the memory buffer to the step counter.

As indicated in the flow chart of FIGURE 2 and shown in FIGURE 8, the $T_5$ pulse actuates the OR circuit 73 to produce the step counter complement pulse, thereby complementing the number (−37+S) in the counter to [−(−37+S)−1=36−S]. Thereafter, the counter contains a new position number (P′) designating the position of the first, right-most, byte in the new memory location specified by the incremented address field of the pointer word.

INCREMENTING THE BYTE POINTER WORD—FINAL OPERATIONS PRODUCING A MASK WORD

By way of summary before describing the subsequent operation in detail, when the instruction register contains an increment instruction so that the FIGURE 6 command circuit has produced the INC OP level, after executing the operations set forth in FIGURE 2, as initiated by the timing pulses $T_1$ through $T_5$, the illustrated data processing system transfers the new position number (P′) from the step counter to the pointer word stored in the memory buffer and then reads the incremented pointer word back into memory.

Where the instruction in the instruction register calls only for an increment operation, i.e., without a load or deposit operation, the byte manipulation instruction is complete at this point and the system is ready to operate on a new instruction.

When the increment instruction in the instruction register calls for a load or a deposit operation, either alone or following an increment operation, the system forms a mask word by loading the byte size number (S) into the step counter, complementing the number (S) in the step counter and then using the complemented number in the step counter to read (S) ONE's into the right end of the accumulator register 18, FIGURE 1. The accumulator register then contains all ZEROS except for (S) ONES at its right end; this is the mask word.

In addition, the position number in the pointer word is transferred by way of a hold register 96 shown in FIGURE 1 from the memory buffer to the step counter, and the flip-flop 30 and flip-flop 32, FIGURE 6, are set to the ONE condition, signalling the end of the first sequence of the byte manipulation operation.

More particularly, in the byte manipulation timing distributor 74 of FIGURE 9, a delay circuit 96 receives the $T_5$ pulse and applies it to an OR circuit 98 whose output pulse is the $T_6$ timing pulse. The OR circuit 98 also develops the $T_6$ timing signal in response to the coincidence of the NOT INC OP level and the execution time $ET_0$ pulse input to an AND circuit 100 whose output operates the OR circuit 98. Thus, during an increment operation, the OR circuit 98 develops the $T_6$ pulse a fixed time after the $T_5$ pulse is developed. Alternatively, during a non-incrementing byte operation, the OR circuit 98 develops $T_6$ pulse upon receipt of the $ET_0$ pulse.

As shown in FIGURE 8, the $T_6$ pulse is applied to the AND circuit 69, the output terminal of which is applied through the OR circuit 65 to produce the step counter clear instruction signal. The other input signal to the AND circuit 69 is the INC OP level developed with the command circuit of FIGURE 6.

The AND circuit 69 of FIGURE 8 is also shown in FIGURE 7 connected to enable the arithmetic register to read in the P′ number stored in the step counter stages 3 through 8. Only the contents of the shift counter stages 3 through 8 are read into the arithmetic register because the sign digit, stored in stage 0, and digits for numbers larger than 35, stored in stages 1 and 2, are not needed since at this juncture the position number is always positive and is never greater than 35.

The circuits used to clear the step counter and to read data into the arithmetic register from the counter have a built-in delay so that the number to be read into the arithmetic register in response to the $T_6$ pulse is sensed before that same pulse causes the counter to be cleared.

Thus, as indicated in the chart of FIGURE 2, when the INC OP level is present, the $T_6$ pulse clears the step counter to store all ZEROS, and transfers the incremented position number (P′) into the position field of the pointer word stored in the arithmetic register.

The $T_6$ pulse is also applied to the OR circuit 80,

FIGURE 9, whose output sets the flip-flop 52 to the ONE condition. As indicated in FIGURE 7, this condition of the flip-flop 52 enables the gates in the step counter to provide a data path between the memory buffer stages 6 through 11 and the step counter.

Thus, the $T_6$ pulse first transfers the position number (P′) from the step counter to stages 0 through 5 of the arithmetic register, clears the step counter, and provides a path for the byte size number (S) to be read into the step counter from the memory buffer 16.

In the FIGURE 9 timing distributor 74, a delay unit 104 delays the $T_6$ pulse to produce the $T_7$ timing pulse. This pulse is applied to the FIGURE 8 OR circuit 75 to produce the step counter partial add instruction signal. As a result, the byte size number (S) is loaded into the step counter.

As indicated in the chart of FIGURE 2, when the INC OP level is present, the $T_7$ pulse also transfers the contents of the FIGURE 1 arithmetic register 14 to the memory buffer 16. This conventional operation is initiated, for example, by applying the pulse to an AND circuit 105, as shown in FIGURE 9, enabled by the INC OP level. This transfer places the incremented byte pointer word in the memory buffer.

The pulse $T_8$, developed by delaying $T_7$ in a delay circuit 106 (FIGURE 9) and, when the INC OP level is present, with an AND circuit 108, initiates a write operation, appropriately performed with conventional techniques, which transfers the incremented byte pointer word from the memory buffer 16 to the memory element 12.

The $T_8$ pulse also sets the flip-flop 110, FIGURE 9, to the ONE state, thereby enabling the AND circuit 112.

Briefly summarizing the sequence of operations thus performed after the $T_5$ pulse when the INC OP level is present, $T_6$ causes the incremented position number (P′) to be read into the arithmetic register from the step counter, which is then cleared to ZERO. In response to the $T_7$ pulse, the incremented pointer word is transferred to the memory buffer and the (S) number is loaded into the step counter. The $T_8$ pulse, developed only when INC OP is present, initiates a conventional sequence for writing the incremented byte pointer word into the memory element of the data processing system.

After the memory element begins the write operation, conventional control circuits therein produce a memory control signal (designated herein as MC) that is applied to the AND circuit 112 (FIGURE 9), which is enabled by the flip-flop 110. The resultant output signal from the AND circuit 112 passes through an OR circuit 114 to produce a $T_{8B}$ timing pulse.

When the INC OP level is not present, i.e. when the system is processing a byte instruction that does not involve the pointer increment operation and the NOT INC OP level is present, the $T_8$ pulse is not developed. Instead, as shown in the FIGURE 2 chart, the logic circuits skip from the $T_7$ pulse to produce the $T_{8B}$ pulse in the following manner, reference being to FIGURE 9. The delayed $T_7$ pulse from the delay circuit 106 is applied to an AND circuit 115 enabled by the NOT INC OP signal. The resultant AND circuit output signal, after passing through the OR circuit 114, is the $T_{8B}$ pulse.

As also shown in FIGURE 9, the $T_{8B}$ pulse is applied to the OR circuit 116 that also receives the CLEAR pulse and whose output is applied to the ZERO input terminal of the flip-flop 110, thereby switching the flip-flop to the ZERO state. This disables the AND circuit 112 so that subsequent memory control (MC) pulses do not develop another $T_{8B}$ pulse. The $T_{8B}$ pulse is also applied to the OR circuit 84 (FIGURE 9) connected with the flip-flop 52 to place this flip-flop in the ZERO state. The purpose of setting the flip-flop 52 to ZERO is to disable the step counter, FIGURE 7, from reading in the contents of the memory buffer stages 6–11.

In order to transfer the new position number (P′) to the step counter with the subsequent $T_9$ pulse, the $T_{8B}$ pulse is applied to the hold register 96, FIGURE 7. In response, the hold register reads in the ONES stored in stages 0 to 5 of the memory buffer.

With reference to FIGURE 8, the $T_{8B}$ pulse is also applied to the OR circuit 73, whose output signal complements the step counter 24, thereby complementing the byte instruction calling for an increment operation only, pulse.

When the instruction register of FIGURE 1 contains a byte instruction calling for an increment operation only, i.e. contains the IBP instruction, the IBP output line **34*b* from the FIGURE 6 decoder 34 is energized and enables an AND circuit 120 shown in FIGURE 9. In response to the delayed $T_{8B}$ pulse it receives from a delay circuit 122, the enabled AND circuit 120** develops a stop pulse that signals that the instruction has been completed. In response to the stop pulse, the data processing system cycles to commence processing the next instruction.

On the other hand, when the instruction register 20 (FIGURE 1) contains a byte instruction other than an IBP instruction, i.e contains a byte instruction calling for either a load or a deposit operation, the stop pulse is not produced and the system continues operating in response to the $T_{8B}$ pulse as follows. The $T_{8B}$ pulse sets a flip-flop 124 (FIGURE 9) to the ONE condition by energizing an AND circuit 126 enabled by the NOT IBP signal on the line **34*a* (FIGURE 6) output from the decoder 34** of FIGURE 6.

As indicated in FIGURE 2, the $T_{8B}$ pulse also initiates a step counter shift and count operation that shifts (S) ONE's into the accumulator register 18 (FIGURE 1) in the left direction. FIGURE 10 shows, at the bottom, the logic circuit of the accumulator register used for the shift operation. The register is appropriately constructed in a conventional manner with 36 flip-flops indicated at **18*a*. The step counter applies shift pulses to a shift input terminal of the rightmost stage of flip-flops. In response, the register shifts either a ONE or a ZERO into the rightmost stage, according to which input line 18*b* and 18*c* is negative. More particularly, each input line 18*b* and 18*c* is clamped negative through a resistor connected to a direct current supply. An OR circuit 18*d* raises the ZERO line 18*c* to ground in response to either the NOT INC OP level or the INC OP level. A gate 18C grounds the ONE input line 18*b*** in response to a DEPOSIT level, developed during the second sequence under a deposit byte instruction.

When the pulse $T_{8B}$ is present, the DEPOSIT level is not present and one of the two levels input to the OR circuit **18*d* is present. Hence, only the ONE input line 18*b* will be negative, so that each shift pulse loads a ONE into the right end of the flip-flops 18*a*. These shift pulses are the $SCT_1$ pulses developed with the step counter shift and count timing circuit 71** shown in FIGURE 8, which will now be described.

The circuit 71 has an AND circuit 138 that receives the NOT IBP level from the FIGURE 6 decoder line **34*a*, and receives the $T_{8B}$ pulse. An OR circuit 140 applies the AND circuit output pulse to a timing and logic circuit 142 connected with the step counter 24. The OR circuit 140 also applies an activating pulse to the circuit 142 in response to a signal from an OR circuit 144** that receives signals developed in performing the byte load and deposit operations.

In response to a pulse from the OR circuit 140, the timing and logic circuit 142 develops an $SCT_1$ shift pulse that adds ONE to the number in the step counter and, as just described with reference to the lower part of FIGURE 10, shifts a ONE left into the accumulator register 18. Since the step counter at this juncture, i.e. when $T_{8B}$ is developed, contains the complement of the byte size number (S), the step counter counts toward zero in response to each $SCT_1$ pulse. The circuit 142 continues producing $SCT_1$ pulses until the step counter stores zero, when the $SCT_2$ pulse is developed.

The step counter shift and count timing circuit 71 also has routing gates 143, constructed with conventional techniques, that route $SCT_1$ shift pulses to the accumulator in the intervals between each $T_{8B}$ pulse and the first $SCT_2$ pulse thereafter.

In this manner, the $T_{8B}$ pulse initiates the step counter shift and count sequence indicated in the FIGURE 2 chart and thereby shifts (S) ONES into the right end of the accumulator register. The $SCT_2$ pulse from the FIGURE 8 timing circuit 71 signals the end of this subroutine, as also indicated in FIGURE 2.

The accumulator register 18, FIGURE 1, now contains a "mask word" consisting of all ZEROS except in the (S) rightmost stages, which contain ONES. The mask word is used in both the *byte load* and the *byte deposit* operations, discussed hereinafter with reference to the flow chart of FIGURE 3 and the FIGURE 12 timing chart.

The $SCT_2$ pulse, developed at the end of the shift count subroutine, is applied to an AND circuit 132, FIGURE 9, connected with the ONE output terminal of the flip-flop 124. As described above, when the system is not performing an increment instruction, the $T_{8B}$ pulse energizes the enabled AND circuit 126 to set the flip-flop 124 to the ONE state. The circuit 132 then passes the $SCT_2$ pulse to produce the next timing pulse, designated $T_{8A}$.

As designated in the chart of FIGURE 2, the $T_{8A}$ pulse is applied to an OR circuit 134 (FIGURE 9) whose output is connected with the ZERO input terminal of the flip-flop 124, thereby setting the flip-flop to ZERO and disabling the AND circuit 132. This prevents subsequent $SCT_2$ pulses from generating spurious $T_{8A}$ pulses. The $T_{8A}$ pulse is also applied through the OR circuit 67 (FIGURE 8) to the OR circuit 65 of FIGURE 8 to clear the step counter.

Also, as indicated in FIGURE 2, the pulse clears stages 13 through 17 of the instruction register 20 of FIGURE 1. It will be recalled that the instruction register is storing a byte manipulation instruction and, as discussed above with reference to FIGURE 4B, when stages 13 through 17, part of the address field, contain all ZEROS, the data processing system uses the number in stages 18 through 35 as the address in memory of the word to be used in the instruction.

Referring again to FIGURE 9, a delay circuit 136 receives the $T_{8A}$ pulse and, at a fixed interval thereafter, produces the $T_9$ pulse. As shown in FIGURE 6, this pulse sets the flip-flops 30 and 32 to the ONE states, thereby signalling that the first sequence of the byte manipulation operation has now been completed.

With these flip-flops in the ONE states, the FIGURE 6 AND circuits 38 and 44 are disabled, and the INC OP and NOT INC OP levels are terminated.

As shown in FIGURE 7, the $T_9$ pulse is also applied to the step counter input terminal that causes the counter to read in the number stored in the hold register 96. The number in the hold register thus transferred to the step counter is the incremented position number (P′) read from the memory buffer 16 in response to the $T_{8B}$ pulse.

At this juncture, the data processing system has completed the first sequence of address, fetch and execution cycles for a byte manipulation instruction. The arithmetic register and the memory buffer each contains the incremented byte pointer word. The accumulator register contains a mask word comprising ONES in its (S) rightmost stages and ZEROS in the rest of its stages. The instruction register still contains the original byte manipulation instruction that initiated the operations just described. Finally, the step counter contains (P′), the position number. Where the byte instruction called for an increment operation, (P′) is the resultant incremented number; otherwise, it is the position number in the original byte pointer word in the memory buffer.

ADDRESS AND FETCH CYCLES OF SECOND SEQUENCE

After an appropriate delay, the last timing pulse $T_9$ from the FIGURE 9 timing distributor initiates an address cycle. During this cycle, according to conventional techniques, the data processing system uses the byte pointer word present in the arithmetic register to compute the address of a word in the memory element.

During the fetch cycle following this address cycle, this word is read into the memory buffer 16, FIGURE 1, from the memory element 12.

SECOND EXECUTION CYCLE—LOAD BYTE

When the instruction register 20, FIGURE 1, contains an LDB or an ILDB instruction, i.e. a byte manipulation instruction calling for a byte to be loaded into a data word, after the fetch cycle of the second sequence is completed, the data processing system proceeds to another execution cycle. The first execution timing pulse $ET_0$ produces two timing pulses $LT_0$ and $LT_{0A}$ for carrying out the load operations.

In response to these two pulses, the memory word containing the byte is shifted right in the arithmetic register (P) bits to place the byte in the (S) rightmost stages of that register. Also, the mask word is read into the memory buffer. The contents of the memory buffer are then ANDed into the arithmetic register, with the result that the arithmetic register contains the byte in its rightmost stages and contains ZEROS in the (36–S) remaining stages. The byte is now available to have conventional arithmetic operations performed on it.

The circuits for performing these operations will now be described in detail; FIGURE 3 shows the separate operations used to carry out these steps in the illustrated system.

Turning to FIGURE 11, the timing distributor 77 for producing the load timing pulses has a decoder 146 connected with stages 0 through 8 of the instruction register 20, i.e. the stages storing the instruction code digits the instruction word. The decoder develops an output signal, applied to enable an AND circuit 148, only when the instruction register stores a load instruction, i.e. an LDB or an ILDB instruction.

The other input signal to the AND circuit 148 is the ONE output level from the flip-flop 30 of FIGURE 6. It will be recalled that this level is present only when the data processing system is prepared to execute the second sequence of a byte manipulation instruction. The output LOAD signal from the AND circuit 148 is applied to an AND circuit 150 that also receives the zero timing pulse for each execution cycle, i.e. the $ET_0$ pulse. When this pulse is coincident with the LOAD level, the AND circuit 150 develops the $LT_0$ pulse, the first timing pulse for the byte load operation.

As summarized in the timing chart of FIGURE 12, the $LT_0$ pulse is applied to the ONE input terminal of a flip-flop 152, shown in FIGURE 11, thereby placing that flip-flop in the ONE condition to enable an AND circuit 154 whose output signal is the other timing pulse for the load operation, i.e. the $LT_{0A}$ pulse. However, the AND circuit 154 does not develop this pulse until it receives an $SCT_2$ pulse; FIGURE 8 shows the circuit 71 for developing this last timing pulse in the shift and count cycle of the step counter 24. The flip-flop 152 is reset to ZERO with the output signal from an OR circuit 156, FIGURE 11.

As designated in FIGURE 4, the $LT_0$ pulse transfers the memory word from the memory buffer 16 (FIGURE 1) to the arithmetic register 14 and causes the memory buffer to receive the mask word from the accumulator register 18. The circuits for carrying out these two transfers are conventional and are not shown.

The $LT_0$ pulse is also applied to the FIGURE 8 OR circuit 73 that produces the step counter complement signal. After receipt of this signal, the step counter contains (−P′−1), the ONE's complement of the position number.

The last operation initiated in response to the $LT_0$ pulse, as shown in the chart of FIGURE 3, and summarized in the FIGURE 12 timing chart, is to shift (P) ZEROS right into the arithmetic register 14. This is done by applying the $LT_0$ pulse to the OR circuit 144 of the FIGURE 8 timing circuit 71. The OR circuit 144 applies the pulse to the OR circuit 140 that initiates a shift and count subroutine for the step counter 24. The $LT_0$ pulse is also applied to the routing gates 143 in the circuit 71 to route $SCT_1$ shift pulses to the left shift input AR(L) of the arithmetic register, FIGURE 10.

The arithmetic register 14 is constructed as shown in FIGURE 10 to shift ONES or ZEROS in response to the shift pulses. As with the accumulator register, the arithmetic register has 36 flip-flop **14*a* and is connected to shift in either directon. At the left end of the sequence of flip-flop 14*a*, the ZERO and the ONE signal lines 14*b* and 14*c* are each normally at a negative potential. A gate 14*d* is connected with the ONE input line 14*c* and, in ressponse to the LOAD signal, raises that line to ground potential. The ZERO and ONE signal lines 14*e* and 14*f* connected to the rightmost stage of the flip-flop 14*a* are similarly normally at a negative voltage and a gate 14*g* raises the ONE input line 14*f* to ground when it receives the DEPOSIT signal. The shift pulses from the step counter timing circuit 71 (FIGURE 8) are applied to the AR(L) shift input terminal of the leftmost of the flip-flops 14*a* and to the shift input terminal AR(R) of the rightmost of the flip-flops 14*a* by way of the routing gates 143 (FIGURE 8). More particularly, the FIGURE 8 routing gates 143** apply the $SCT_1$ pulses to the leftmost stage of the arithmetic register in the interval between the $LT_0$ pulse and the first $SCT_2$ pulse thereafter, and to the rightmost stage of the arithmetic register in the interval between the $DT_0$ pulse and the first $SCT_2$ pulse thereafter.

With this arrangement of the arithmetic register 14, when the $LT_0$ pulse initiates the step counter shift and count sequence, the gate **14*d* in FIGURE 10 is conducting to maintain the ONE input line 14*c*** at ground potential. Thus, the shift pulses received at the AR(L) shift input terminal shift the data word in the arithmetic register to the right, reading (P) ZEROS into the left end of the register. This operation moves the byte of size (S), initially positioned (P) digits from the right end of the word read into the arithmetic register from the memory buffer, in the (S) rightmost stages of the arithmetic register. That is, the byte located at the address specified by the byte pointer word is now right justified in the arithmetic register.

The $SCT_2$ pulse, developed with the timing circuit 71 (FIGURE 8) at the end of the shift and count subroutine, i.e. when the number in the step counter is zero, is applied to the FIGURE 11 AND circuit 154. This circuit is already enabled by the flip-flop 152 in FIGURE 11 in response to the $LT_0$ pulse. Accordingly, the AND circuit 154 develops the $LT_{0A}$ pulse in response to the $SCT_2$ pulse. As also shown in FIGURE 11, the $LT_{0A}$ pulse is applied through an OR circuit 156 to place the flip-flop 152 in the ZERO state, thereby disabling the AND circuit 154, rendering it insensitive to subsequent $SCT_2$ pulses.

As indicated in the chart of FIGURE 3 and shown in FIGURE 6, the $LT_{0A}$ pulse is applied through the OR circuit 33 to the ZERO input terminal of the flip-flop 32, thereby placing that circuit in the ZERO state.

The last operation initiated with the $LT_{0A}$ pulse is, as designated in the chart of FIGURE 3, to transfer the ZEROS of the mask word in the memory buffer into the arithmetic register, which contains the selected byte. Thereafter, the contents of the arithmetic register (AR) and of the memory buffer (MB) are:

AR:0000 . . . . 000 byte
MB:0000 . . . . 0001111

The byte is now available in the rightmost (S) stages of the arithmetic register in exactly the same form it had in the data word. That is, none of the byte digits are altered and they are in the same requence as in the data word from which they were read. The byte is thus now accessible for processing according to conventional techniques, and the data processing system is ready to process a new instruction.

SECOND EXECUTION CYCLE—DEPOSIT BYTE

When a deposit byte instruction (IDPB or DPB) is to be executed, the address field of the instruction word is programmed to the address of a byte pointer word whose address field specifies the memory address of a data word into which a byte of (S) digits is to be stored with the rightmost digit of the byte being (P) digits from the right end of the words.

The address and fetch cycles preceding the execution cycle of the second sequence (i.e. between the first and second execution cycles processing the byte manipulation instruction in the instruction register 20) read this data word from the memory element 12, FIGURE 1, into the memory buffer 16. In addition, the data processing system is programmed to load the byte into the rightmost (S) stages of the arithmetic register 14. The contents of the remaining arithmetic register stages are not material.

Thus, at the end of these addresses and fetch cycles, the arithmetic register contains the byte to be deposited in the memory word, which is stored in the memory buffer. The accumulator register 18 contains the mask word, produced in response to $T_{8B}$ pulse of the execution cycle in the first sequence. The step counter contains the position number (P′), loaded therein in response to the preceding $T_9$ pulse. The contents of the memory buffer, accumulator register and step counter are hence the same as at the beginning of the second execution cycle of a load byte instruction.

In general, when the instruction register 20, FIGURE 1, stores a deposit instruction, i.e. a DPB or an IDPB instruction, after processing the first sequence of pulses as described above with reference to FIGURES 2 and 5, and after the subsequent address and fetch cycles, when the data processing system initiates the first pulse, $ET_0$, of the new execution cycle, a sequence of deposit timing pulses is generated.

As will now be described, these DT pulses combine the byte, the mask word and a memory word to produce a resultant word identical to the memory word except that the (S) digits therein located (P) digits from the right end contain the byte.

The circuits for carrying out this operation will be described with reference to the flow chart of FIGURE 3 and with reference to FIGURE 14, which lists the contents of the arithmetic register (AR), the accumulator register (ACC), and the memory buffer (MB) at each stage in the operation.

The DT pulses are produced with the circuit shown in FIGURE 13. It comprises a decoder 158 that receives the instruction code digits of the instruction word in the instruction register 20. The decoder produces an output level when either a DPB or an IDPB instruction is in the register 20. This level enables an AND circuit 160 whose other active input signal is the level indicating that the flip-flop 30 is in the ONE state. In response to these two levels, the AND circuit 160 produces a DEPOSIT level that is ANDed with the $ET_0$ pulse in an AND circuit 162 to produce a $DT_0$ pulse.

As also shown in FIGURE 13, the $DT_0$ timing pulse sets a flip-flop 164 to the ONE state, thereby enabling an AND circuit 166.

As indicated in the chart of FIGURE 3, in addition to setting the flip-flop 164 to ONE, the $DT_0$ pulse is applied to the FIGURE 8 OR circuit 73 to complement the step counter, which then contains the ONE's complement of (P′), i.e. (−P′).

The $DT_0$ pulse is also applied to the OR circuit 144 in the FIGURE 8 timing circuit 71, thereby initiating a step counter shift and count subroutine. The timing circuit routing gates 143 apply the $SCT_1$ shift pulses to the rightmost stage of the register **14*a* (FIGURE 10) of the arithmetic register 14 and to the accumulator register 18*a***.

As shown in FIGURE 10, the DEPOSIT level causes the arithmetic register gate **14*g* to ground the ONE input line 14*f*, and hence the $SCT_1$ pulses load ZEROS into the arithmetic register and shift the byte therein (P) digits to the left. The accumulator register gate 18*e*** is also rendered conductive by the DEPOSIT level, and (P) ZEROS are shifted left into the accumulator register.

Hence, when the $SCT_2$ pulse is produced at the end of this subroutine, the byte is aligned in the arithmetic register at the position into which it is to be deposited in the data word, and the mask of ONES in the accumulator register is in the same position.

Figures 14A, 14B, 14C, 14D, 14E, 14F:
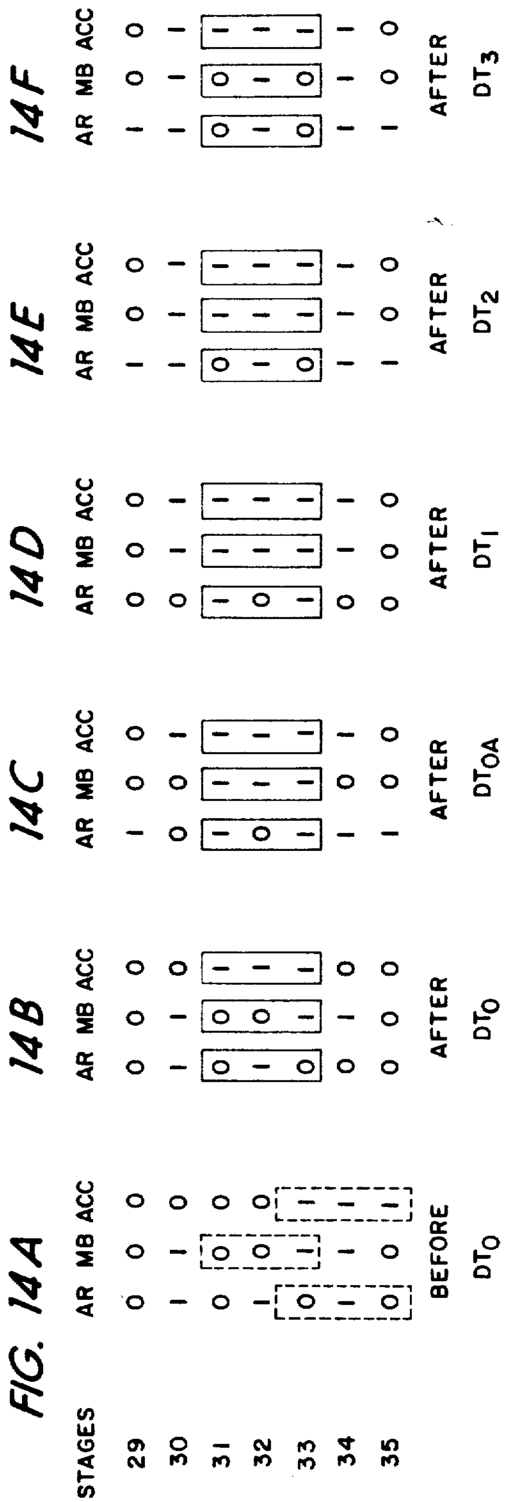

Referring to FIGURE 14, assume for example that before $DT_0$ is produced, the seven rightmost digits (i.e. in stages 25–30) of the words in the arithmetic register and in the memory buffer are as shown in FIGURE 14A. When, for example, (S)=3 and (P′)=2, the accumulator register stores a mask word of the form shown. The byte in the arithmetic register then is 010, and it is to be loaded into the shaded bits of the memory buffer word. The mask and byte are also shaded throughout FIGURE 14.

After the shift operations produced in response to the $DT_0$ pulse, the end seven stages of the three registers indicated in FIGURE 14 have the contents shown in FIGURE 14B.

In FIGURE 13, the $SCT_2$ pulse from the shift operation actuates the enabled AND circuit 166 to develop the $DT_{0A}$ pulse. As shown in the flow chart of FIGURE 3, this pulse complements the word in the arithmetic register and parallel transfers the mask from the accumulator register to the memory buffer. Simultaneously, the pulse initiates a conventional inclusive OR transfer of the ONES in the memory buffer to the accumulator register. The memory buffer now has the mask word and the accumulator register has the data word except that the mask of ONES is still in the (S) stages starting (P′) stages from the right end, i.e. from stage numbered 35. The resultant contents of these registers are shown in FIGURE 14C.

The $DT_{0A}$ pulse is successively delayed in delay circuits 168, 170 and 172, FIGURE 12, to produce, in time succession, $DT_1$, $DT_2$ and $DT_3$ pulses.

The $DT_1$ pulse transfers the ZEROS in the memory buffer to the arithmetic register, thereby clearing to ZERO the arithmetic register stages where the memory buffer stored a ZERO. This pulse also produces a jam or parallel transfer of the accumulator register contents into the memory buffer. FIGURE 14D shows the resultant contents of the registers.

The $DT_2$ pulse complements the arithmetic register, so that the last seven stages therein now store the digits listed in FIGURE 14E.

The result of successively complementing the arithmetic register ($DT_0$), transferring the accumulator register contents to the memory buffer ($DT_{0A}$), reading the memory buffer ZEROS into the arithmetic register ($DT_1$) and then again complementing the arithmetic register ($DT_2$), is to write ONE in each stage of the arithmetic register where the mask word has a ZERO. As noted above with reference to FIGURE 1, the illustrated system has no data path directly between the arithmetic register and the accumulator register, and hence the mask word is transferred from the accumulator register to the arithmetic register via the memory buffer.

The subsequent $DT_3$ pulse transfers into the memory buffer the ZEROS of the arithmetic register. As seen by comparing FIGURES 14A and 14F, the memory buffer now stores the same digits it contained before $DT_0$, except that at the byte location (S=3) and (P=2), i.e. in stages numbered 31, 32 and 33, it stores the byte originally in the arithmetic register. That is, the byte originally in the arithmetic register has been deposited in a selected location within the data word stored in the memory buffer, while retaining the contents of all the other memory buffer stages. The modified data word is now ready to be read back into the memory element 12 (FIGURE 1) of the data processing system.

As also indicated in the chart of FIGURE 3, the $DT_3$ pulse is applied to the FIGURE 6 OR circuit 33 to clear the flip-flop 32.

The byte instruction is now fully executed. The data processing system next processes a new instruction following conventional practices.

It will thus be seen that the objects set forth above, among those made apparent from the preceding description, are efficiently attained and, since certain changes may be made in the above constructions without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described the invention, what is claimed as new and secured by Letters Patent is:

1. Apparatus in an electronic digital data processing system operating with words (N) digits long, said apparatus comprising in combination

- (A) first, second and third register means for storing first, second and third digital numbers respectively,
- (B) means for computing the difference between said first and second numbers and producing a sign number indicating the sign of the difference number,
- (C) logic control means
  - (1) responding to a sign number indicating that said first number is equal to or greater than said second number and storing said difference number in said first register, and
  - (2) responding to a sign number indicating that said first number is less than said second number and changing the number in said third register by one digit and storing in said first register (N) minus said second number.

2. Apparatus in an electronic digital data processing system operating with words (N) digits long, said apparatus comprising in combination

- (A) an addressable memory element,
- (B) first and second instruction register means for storing, respectively, an instruction code number and an address number,
- (C) first, second and third pointer register means for storing, respectively, first, second and third pointer numbers,
- (D) address processing and fetch means responding to a selected instruction code number in said first instruction register means to fetch from said memory, and store in said pointer register means, first, second and third pointer numbers at the memory address identified by the address number in said second instruction register means,
- (E) means for computing the difference between said first and second pointer numbers and producing a sign number indicating the sign of the difference number,
- (F) further register means, (G) logic control means operated in response to said selected instruction code number to
(1) operate said difference computing means to compare the numbers in said first and second pointer registers and develop said difference and sign numbers in response thereto,
(2) respond to a sign number indicating that said first number is equal to or greater than said second number and store said difference number in said first register,
(3) respond to a sign number indicating that said first number is less than said second number and change the number in said third register by one digit and store in said first register (N) minus said second number, and
(4) then operate said address processing and fetch means to store in said further register means the word at the memory address identified by the number in said third pointer register means.

3. Apparatus for incrementing a pointer word in an electronic digital data procesing system operating with data words, said pointer word comprising a first number (P), a second number (S) and an address number, said apparatus comprising in combination
(A) a first register having first, second and third portions for storing said first, second and address numbers respectively, of said pointer word,
(B) means for producing an increment signal,
(C) an accumulator register for adding two digital numbers and developing in response thereto a digital resultant number and a digital sign number,
(D) first gates in circuit between said first portion of said first register and said accumulator register,
(E) second gates in circuit between the second portion of said first register and said accumulator register,
(F) sequence control means operating said first and second gates when said increment signal is present to transfer the complement of one of said (P) and (S) numbers and the other number to said accumulator register for addition therein so that said accumulator register produces a resultant number equal to the difference between said (P) and (S) numbers, and
(G) further sequence control means,
(1) responding to a sign number indicating that said (P) number is equal to or greater than said (S) number and storing said resultant number in said first portion of said first register,
(2) responding to a sign number indicating that said (P) number is less than said (S) number and
(a) presetting said accumulator register to a number equal to the complement of the number of digits in said data word and transferring said (S) number to said accumulator register thereby to cause said accumulator register to compute a resultant number equal to the number of digits in said data word less said (S) number,
(b) transferring said resultant number to said first portion of said first register, and
(c) incrementing said address number in said third part of said first register by one digit.

4. Apparatus according to claim 3 further comprising
(A) an instruction register for storing an instruction word having a code portion and an address portion,
(B) decoding means developing said increment signal and alternatively developing an increment-and-process signal in response to different instruction code numbers in said instruction register,
(C) a further register,
(D) means in said further sequence control means for developing a complete signal upon finishing the operations it performs,
(E) means writing into said further register the word stored at the memory address identified by said address number in said first register when both said increment-and-process signal and said complete signal are present,
(F) means for processing said word in said further register according to the instruction identified by the instruction code digits in said instruction register,
(G) a program counter normally advancing the count therein after said further sequence control means has completed said operation it performs, and
(H) means inhibiting the count advance operation of said program counter when said increment-and-process signal is present until after said processing means has initiated said processing operation.

5. Apparatus in an electronic digital data processing system operating with digit words of length (N), said apparatus comprising in combination
(A) an addressable memory element,
(B) first and second registers,
(C) a third register having first, second and third portions,
(D) first means for writing into said third register the word in said memory element at the address specified by the number in said second register means,
(E) increment means
(1) computing the sign and magnitude of the difference between the numbers in said first and second portions of said third register,
(2) storing in said first portion of said third register the number corresponding to said magnitude when said sign has a first value,
(3) storing in said first portion of said third register the difference between (N) and the number in said second portion of said third register, and incrementing by a selected quantity the number in said third portion of said third register when said sign has a second value,
(F) second means writing into said first register the word in said memory element at the address specified by the number in said third portion of said third register, and
(G) logical sequencing control means for operating in succession said first means, said increment means, and then said second means when the number in said second register identifies a byte instruction.

6. Apparatus in an electronic digital data processing system for operating on a byte in a data word, said apparatus comprising in combination
(A) first register means for storing a size number identifying the number of digits in said byte,
(B) second register means for storing a position number identifying the number of digits between said byte and one end of said data word,
(C) third register means for storing said data word,
(D) means for shifting said data word in said third register means toward the end of said register corresponding to said one end of said word by the number of digits identified by said position number, and
(E) means for writing a selected digit in each stage of said third register means except for the stages identified by said size number located at said end of said third register means.

7. Apparatus in an electronic digital data processing system for operating on a byte in a data word, said apparatus comprising in combination
(A) first register means for storing a size number identifying the number of digits in said byte,
(B) second register means for storing a position number identifying the number of digits between said byte and one end of said data word,
(C) third register means for storing said data word,
(D) means for writing a ZERO into each stage of said third register means excluding the stages storing said byte as identified by said numbers in said first and second register means.

8. Apparatus according to claim 7 in which said writing means comprises
(A) fourth register means, (B) means for storing in said fourth register means all ZEROs except for a mask of ONES, the number of ONES being identified by said size number in said first register means,
(C) means for aligning the position of said byte in said third register means with the position of said mask in said fourth register means according to the position number in said second register means, and
(D) means for writing a ZERO in each stage of said third register means where said fourth register means stores a ZERO.

9. In an electronic digital data processing machine, the combination comprising
(A) instruction register means having at least an instruction code portion and an address portion,
(B) addressable memory means,
(C) first, second and third register means,
(D) transfer means for transferring to said first register means a digital word having at least first and second parts from an address in said memory means identified by the number in said address portion of said instruction register means, and
(E) control means actuated when said instruction register means contains a selected instruction code number and
(1) storing a mask of first digits in a number of contiguous stages of said second register means, which number of stages is determined by the number in said first part of said word in said first register means, and storing second digits in the rest of the stages of said second register means,
(2) shifting one of said mask and the word in said third register by a number of digits determined by the number in said second part of said word in said first register means thereby to align said mask of first digits with a word in said third register, and
(3) transferring the second digits in parallel from said second register means into said third register means.

10. Apparatus for performing a byte operation in a digital data processing system, said apparatus comprising in combination
(A) first shiftable register means for storing a data word including a byte,
(B) second register means for storing a pointer word having at least first and second parts, the numbers in said first and second parts of said pointer word identifying respectively the size of said byte stored in said first register means and the position of said byte from one end of said data word,
(C) third shiftable register means,
(D) shift counter means for shifting selected binary digits into said first and third register means in response to the number stored in said counter means and in response to shift instruction signals,
(E) means transferring the number in the first part of said second register from said second register to said counter means and causing said counter means to shift a number of binary digits, which number is determined by the number in the first part of said second register means, into said third register means,
(F) means transferring the number in the second part of said second register from said second register to said counter means and causing said counter means to shift a number, which number is determined by the number in said second part, into one of said first and third register means to place said byte in the same position in said first register means as the the position of said first digits in said third register means, and
(G) means transferring the binary digits in said third register means to said first register means.

11. Apparatus in a digital data processing system for storing a byte in a register, said apparatus comprising in combination
(A) a first register having first, second and third portions for storing an (S) number corresponding to the size of said byte, a (P) number corresponding to the position of said byte in said byte storing register, and an address number, respectively, of a pointer word,
(B) an addressable memory element,
(C) second and third registers,
(D) means for transferring to said second register the data word stored in said memory element at the address identified by said address number stored in said first register,
(E) means for shifting (P) binary digits into said second register from a first end thereof, thereby to position a byte in said data word at the second end of said second register,
(F) means storing in said third register a mask word having first binary digits only in the (S) stages adjacent the second end of said third register, second binary digits being stored in the remaining stages of said third register, and
(G) means for transferring in parallel manner the second binary digits stored in said third register to said second register.

12. In an electronic digital data processing system, apparatus for extracting a byte from a data word, said apparatus comprising
(A) an instruction register for storing an instruction word having at least a code portion and an address portion,
(B) a first shiftable register for storing a data word including a byte,
(C) a second register for storing a pointer word comprising at least a (P) number identifying the position of said byte from a second end of said data word and an (S) number identifying the number of digits in said byte,
(D) a third register,
(E) a step counter,
(F) timing means for developing sequences of timing signals,
(G) decoding means
(1) developing a first signal when the digits in said code portion of said instruction register identify a byte operation, and
(2) developing also a second signal when said digits in said code portion of said instruction register identify a load byte operation, and
(H) control means
(1) becoming active when both said first signal and a first timing signal are present and storing in said third register a number consisting of second binary digits except for (S) first binary digits at one end thereof, and
(2) becoming active when said second signal is present coincident with a subsequent timing signal and transferring said (P) number to said step counter and causing said step counter to shift the digits in said first register by (P) digit-places toward one end thereof and thereafter parallel transferring the second digits from said third register to said first register whereby all the stages of said first register except those containing said byte store said second digit.

13. Apparatus for transferring a byte of (S) digits into a data word (P) digits from one end of said word, said apparatus comprising in combination,
(A) pointer register means for storing a pointer word having at least first and second parts, the numbers in first and second parts of said pointer word identifying respectively said (P) and (S) numbers,
(B) data word register means for storing the data word into which said byte is to be transferred,
(C) byte register means for storing said byte of (S)

digits (P) digits from one end of said byte register means, (D) mask register means, (E) means for storing in said mask register means a mask word having binary ONES only in the (S) stages located (P) stages from one end of said mask register means, (F) gate means for loading a binary ONE into each stage of said byte register means at which the corresponding stage of said mask register means contains a binary ZERO, (G) gate means for storing a binary ONE in each stage of said data word register means at which said mask register means stores a binary ONE, and (H) gate means for storing in each stage of said data word register means a binary ZERO where said byte register means stores a binary ZERO.

14. Apparatus according to claim 13 in which said means for storing said mask word comprises step counter means connected with said pointer word register means to receive the number in said first part therein and connected with said byte register means to shift the contents thereof (P) stages from said one end thereof, thereby to position the byte therein.

15. Apparatus in an electronic digital data processing system for depositing a byte of (S) digits in a data word with (P) digits between one end of said byte and one end of said word in accordance with at least one control word containing digits corresponding to said (S) digits and said (P) digits, said apparatus comprising in combination (A) a first multiple stage register, (B) means for writing said byte in (S) contiguous stages at one end of said first register, (C) a second multiple stage register, (D) means for writing said data word into said second register, (E) means for shifting said byte in said first register (P) stages toward the other end thereof, (F) means for storing a binary ONE in each stage of said first register other than the stages storing said byte, (G) means for storing binary ONES in the (S) stages of said second register spaced (P) stages from said one end thereof, and (H) means for transferring, in parallel fashion, each binary ZERO from said first register to said second register.

16. Apparatus in an electronic digital processing system for depositing a byte of (S) digits in a data word with (P) digits between said byte and one end of said word in accordance with at least one control word containing digits corresponding to said (S) digits and said (P) digits, said apparatus comprising in combination (A) a first multiple stage register, (B) (1) means for writing said byte in said first register in (S) stages contiguous with one end of said first register, and (2) means for shifting said byte (P) stages toward the other end of said register, (C) a second multiple stage register, (D) means for writing said data word in said second register, (E) a third multiple stage register, (F) means for writing in said third register a mask word consisting of binary ZEROS except at the (S) stages located (P) stages from one end of said third register, (G) means for storing a ONE in each stage of said first register where said third register stores a ZERO, (H) means for storing a ONE in each stage of said second register where said third register stores a ONE, and (I) means for storing a ZERO in each stage of said second register where said first register stores a ZERO.

17. Apparatus according to claim 16 in which said means for writing into said third register comprises (A) means for clearing each stage of said third register to ZERO, and (B) means for shifting (S) ONES and then (P) ZEROS into said third register from said one end thereof.

18. Apparatus according to claim 16 in which said means for placing a ONE in each stage of said first register where said third register stores a ZERO comprises (A) means for complementing said first register, (B) means for reading the ZEROS from said third register into said first register, and (C) means for successively operating said complement means, said read means, and said complement means again.

19. Apparatus in an electronic digital data processing system for operating on a byte, said apparatus comprising in combination (A) a first register having first and second portions for storing respectively a number identifying the size of said byte and a number identifying the position at which said byte is to be stored in a data word, (B) a second register for storing the byte, (C) a third register for storing a data word, (D) a fourth data storage register, (E) a step counter for shifting binary digits into said second and fourth registers, (F) sequence control means, operable to successively (1) transfer said size number from said first portion of said first register to said step counter and operate said step counter to shift a number of ONES identified by said size number into said second register from one end thereof, (2) transfer said position number from said second portion of said first register to said step counter and operate said step counter to shift a number of ZEROS identified by said position number into said second register from one end thereof, (3) write into said second register ONES at the digit positions where said fourth register stores ZEROS, (4) write into said third register ONES where said fourth register stores ONES, and (5) write into said third register ZEROS where said second register stores ZEROS.

20. Apparatus according to claim 19 in which said sequence control means is constructed to write ONES into said second register where said fourth register stores ZEROS by successively complementing said second register, writing ZEROS into said second register where said fourth register stores ZEROS and again complementing said second register.

21. In an electronic digital data processing machine, apparatus for manipulating a byte of length less than the length of a data word in accordance with information contained in at least one register specifying the size of the byte and its position within another register, said apparatus comprising (A) instruction register means for storing an instruction word having at least an instruction code portion and an address portion, (B) addressable memory means, (C) first, second, third and fourth registers for storing digital words, (D) means for storing a mask of first digits in a number of contiguous stages of said second register, which number of stages is determined by the number in a first part of a word in said first register and storing second digits in the rest of the stages of said second register, (E) means for shifting the contents of said second and third registers toward first ends thereof by a number of digit positions, which number is determined by a number in a second part of said word in said first register and for supplying said second digits to the stages from which said first digits have been shifted, (F) means for loading said first digits into each digit position of said third register where said second register contains said second digits, (G) means for transferring in parallel the first digits from said second register to said fourth register, and (H) means for transferring in parallel the second digits from said third register to said fourth register.

22. In an electronic digital data processing system for executing address cycles, fetch cycles and execution cycles in response to programmed instructions, and subject to program interruption at the completion of each execution cycle, apparatus comprising the combination of (A) first means causing said system to process a selected instruction in first and second successive sequences of address, fetch and execution cycles, (B) second means causing said system to repeat both said sequences of cycles when processing of one of said selected instructions is resumed following an interrupt, and (C) third means inhibiting selected operations in said first execution cycle upon resumption of processing of said selected instruction following an interrupt.

23. In an electronic digital data processing system (1) for executing address cycles, fetch cycles and execution cycles in response to programmed instructions, (2) having an instruction register for storing the instruction being processed, and (3) subject to program interruption at the completion of each execution cycle, apparatus comprising the combination of (A) first means causing said system to process first and second selected instructions in first and second successive sequences of address, fetch and execution cycles, (B) second means responsive to the instruction in said instruction register and executing a first operation during said first execution cycle when said instruction register contains said first selected instruction and alternatively executing a second operation during said first execution cycle when said instruction register contains said second selected instruction, (C) third means causing said system to repeat both said sequences of cycles when processing of said selected instructions is resumed following an interrupt, and (D) fourth means inhibiting said first operation in said first execution cycle upon resumption of processing of said first selected instruction following an interrupt.

24. A claim according to claim 23

(A) in which said data processing system also includes a program counter normally incremented at the beginning of each address cycle, and (B) further comprising means inhibiting the incrementing of said program counter when one of said first and second selected instructions is stored in said instruction register until said second sequence for carrying out said selected instructions has commenced.

25. Apparatus for executing first and second selected instructions in first and second successive execution cycles in an electronic digital data processing system subject to program interruption between execution cycles, said apparatus comprising in combination (A) first means for incrementing address information in a word in said first execution cycle when said first instruction is being processed, (B) sequence interrupt means storing the status of an interrupted program and reinstating said interrupted program status when said system resumes operation of said interrupted program, (C) a first register storing a word identifying which of said first and second sequences is being performed when one of said first and second instructions is being processed, and (D) a second register (1) storing a selected digital word when said first sequence has once been completed for an instruction, (2) connected with said sequence interrupt means for preserving the number stored therein in the event of an interrupt, and (3) inhibiting said first means from incrementing said address word when said first execution cycle is being repeated following an interrupt.

26. Apparatus for executing first and second selected instructions in first and second successive execution cycles in an electronic digital data processing system subject to program interruption between execution cycles, said apparatus comprising in combination (A) an instruction register storing the instruction being processed, (B) means inhibiting changing the instruction word in said instruction register when said instruction register stores one of said first and second selected instructions until after the initiation of the second execution cycle for said selected instruction, (C) a first register storing a first digital number during said first cycle and storing a second digital number during said second cycle for each said instruction, (D) a second register normally storing a third number and storing a fourth number when said first cycle is being performed for the first time after any of said selected instructions is written in said instruction register, (E) sequence interrupt means storing the status, including the number in said second register of an interrupted program and rewriting said status information in said system upon resumption of said interrupted program, and (F) means incrementing a digital number when both said instruction registers store said first selected instruction and when said first and second registers respectively store only said first and fourth numbers.

References Cited

UNITED STATES PATENTS

| | | | |
|---|---|---|---|
| 2,923,475 | 2/1960 | Ketchledge | 235—175 |
| 2,969,913 | 1/1961 | Cherin et al. | 235—157 |
| 3,167,740 | 1/1965 | King et al. | 340—146.2 |
| 3,195,109 | 7/1965 | Behnke | 340—172.5 |
| 3,221,308 | 11/1965 | Petersen et al. | 340—172.5 |
| 3,242,468 | 3/1966 | McDermid et al. | 340—172.5 |

ROBERT C. BAILEY, *Primary Examiner.*

R. B. ZACHE, *Assistant Examiner.*

UNITED STATES PATENT OFFICE
CERTIFICATE OF CORRECTION

Patent No. 3,401,375 September 10, 1968

Chester G. Bell et al.

It is certified that error appears in the above identified patent and that said Letters Patent are hereby corrected as shown below:

Column 2, line 5, "fromat" should read -- format --; line 47, after "such" insert -- as --. Column 5, line 43, "then in the same state as when the byte" should read -- stored at a location illustratively designated --. Column 8, line 18, after "pulse" insert -- or --. Column 9, line 60, "or" should read -- of --. Column 11, line 50, cancel "then repeats", first occurrence. Column 14, lines 7 and 8, instruction calling for an increment operation only, pulse." should read -- size number (S) preset therein in response to $T_7$ pulse. --. Column 17, lines 18, 20 and 25, "flop", each occurrence, should read -- flops --. Column 18, line 9, "requence" should read -- sequence --; line 32, "addresses" should read -- address --. Column 19, line 26, "25-30" should read -- 29-35 --; line 69, before "ONE" insert -- a --.

Signed and sealed this 1st day of September 1970.

(SEAL)
Attest:

EDWARD M.FLETCHER,JR.
Attesting Officer

WILLIAM E. SCHUYLER, JR.
Commissioner of Patents